(12) United States Patent
Derbez et al.

(10) Patent No.: US 11,372,111 B2
(45) Date of Patent: *Jun. 28, 2022

(54) INTERNET-BASED TIME AND FREQUENCY RECOVERY FOR POSITION FIXING OF GNSS RECEIVER

(71) Applicant: iPosi, inc., Denver, CO (US)

(72) Inventors: Eric Derbez, Vancouver (CA); Christopher Neil Kurby, Streamwood, IL (US); Derek Glass, Longmont, CO (US)

(73) Assignee: iPosi, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,709

(22) Filed: Jul. 20, 2020

(65) Prior Publication Data

US 2021/0141096 A1    May 13, 2021

Related U.S. Application Data

(63) Continuation of application No. 15/977,734, filed on May 11, 2018, now Pat. No. 10,718,870.

(60) Provisional application No. 62/505,559, filed on May 12, 2017, provisional application No. 62/505,585, filed on May 12, 2017, provisional application No.
(Continued)

(51) Int. Cl.
| | |
|---|---|
| *H04B 7/185* | (2006.01) |
| *G01S 19/25* | (2010.01) |
| *G01S 19/23* | (2010.01) |
| *G01S 19/27* | (2010.01) |
| *H04L 12/433* | (2006.01) |
| *H04W 56/00* | (2009.01) |

(Continued)

(52) U.S. Cl.
CPC ............ *G01S 19/256* (2013.01); *G01S 19/23* (2013.01); *G01S 19/27* (2013.01); *H04B 7/2693* (2013.01); *H04B 17/364* (2015.01); *H04L 12/433* (2013.01); *H04W 56/005* (2013.01); *H04W 56/0015* (2013.01)

(58) Field of Classification Search
CPC ........ G01S 19/256; G01S 19/23; G01S 19/27; H04W 56/0015; H04W 56/005; H04B 17/364; H04B 7/2693
USPC .............................. 342/352, 357.62, 357.66
See application file for complete search history.

(56) References Cited

U.S. PATENT DOCUMENTS

| | | |
|---|---|---|
| 6,323,804 B1 | 11/2001 | Kurby et al. |
| 7,016,443 B1 | 3/2006 | Splett |

(Continued)

*Primary Examiner* — Chuong P Nguyen
(74) *Attorney, Agent, or Firm* — Holzer Patel Drennan

(57) ABSTRACT

Determination of one or more timing (phase) and/or frequency corrections to be made to a local time base of a receiver device to synchronize the local time base with the time of GPS or other highly accurate time base. Timing packets from one or more grandmaster devices whose time bases are substantially the same as that of GPS or the like and/or positioning system signals (e.g., GPS signals) directly from a positioning system are received and manipulated to determine the timing and/or frequency corrections. The corrected time base may be used to assist in acquiring such positioning signals to allow for higher accuracy correction and/or for downstream communication operation. The present utilities are advantageous such as when a sufficient number of channels (e.g., four) from the receiver device to positioning system satellites are unavailable to synchronize the local time base to the GPS or other accurate time base.

20 Claims, 15 Drawing Sheets

Related U.S. Application Data

62/571,333, filed on Oct. 12, 2017, provisional application No. 62/613,853, filed on Jan. 5, 2018.

(51) Int. Cl.
 *H04B 17/364* (2015.01)
 *H04B 7/26* (2006.01)

(56) References Cited

U.S. PATENT DOCUMENTS

| | | | |
|---|---|---|---|
| 7,876,791 B2 | 1/2011 | Jung et al. | |
| 8,041,505 B2 | 10/2011 | Pierce et al. | |
| 8,275,087 B2 | 9/2012 | Hadzic et al. | |
| 8,300,749 B2 * | 10/2012 | Hadzic | H04J 3/0664 370/503 |
| 8,533,355 B2 | 9/2013 | Froehlich et al. | |
| 8,788,689 B2 * | 7/2014 | Froehlich | H04J 3/0667 709/230 |
| 9,236,967 B1 * | 1/2016 | Mustiere | H04L 7/0016 |
| 9,276,591 B2 | 3/2016 | Hadzic | |
| 9,444,566 B1 | 9/2016 | Mustiere et al. | |
| 9,673,970 B1 | 6/2017 | Aweya et al. | |
| 9,749,972 B2 | 8/2017 | Bin Sediq et al. | |
| 9,894,587 B2 * | 2/2018 | Aweya | H04L 43/106 |
| 10,423,190 B1 * | 9/2019 | Gopalakrishnan | G06F 1/12 |
| 10,718,870 B2 * | 7/2020 | Derbez | H04B 7/2693 |
| 2002/0184653 A1 | 12/2002 | Pierce et al. | |
| 2005/0041725 A1 | 2/2005 | De et al. | |
| 2009/0052431 A1 * | 2/2009 | Kroener | H04J 3/0664 370/350 |
| 2010/0034191 A1 | 2/2010 | Schulz | |
| 2016/0269170 A1 | 9/2016 | Kurby | |
| 2017/0094620 A1 | 3/2017 | Yago | |
| 2019/0037507 A1 | 1/2019 | Shamir et al. | |

* cited by examiner

INTERNET-BASED TIME AND FREQUENCY RECOVERY FOR POSITION FIXING OF GNSS RECEIVER

RELATED APPLICATIONS

This application is a continuation of U.S. application Ser. No. 15/977,734, filed on May 11, 2018, titled INTERNET-BASED TIME AND FREQUENCY RECOVERY FOR POSITION FIXING OF GNSS RECEIVER", which is a non-provisional of U.S. Patent App. No. 62/613,853, entitled "Internet-Based Time and Frequency Recovery for Position Fixing of GNSS Receiver," and filed on Jan. 5, 2018; and a non-provisional of U.S. Patent App. No. 62/505,585, entitled "Enhanced Frequency Recovery from PTP," and filed on May 12, 2017; and a non-provisional of U.S. Patent App. No. 62/505,559, entitled "Timing Transfer from PTP for GPS," and filed on May 12, 2017; and a non-provisional of U.S. Patent App. No. 62/571,333, entitled "Enhanced Time Recovery from PTP," and filed on Oct. 12, 2017, all of which are incorporated herein by reference to the extent permitted by law.

BACKGROUND

Global satellite navigation fulfills many pervasive needs. Initially a service for military and general aviation, the use of satellite navigation systems continues to expand into many commercial and consumer products for applications ranging from casual applications to emergency services. The preponderance of Global Navigation Satellite System (GNSS) products are enabled by the Global Positioning System (GPS) as managed by the United States Air Force. GPS is now or may soon be joined by several additional GNSS systems including: Globalnaya Navigazionnaya Sputnikovaya Sistema (Glonass) (Russia), Galileo (European Space Agency), BeiDou Navigation Satellite System (China), and Quasi-Zenith Satellite System (QZSS) (Japan).

Many electronic devices, including mobile computing devices (e.g., tablets, phones, laptops, etc.), have been developed that leverage GNSS capabilities to facilitate location-based services and/or emergency caller location services in response to government requirements. Furthermore, small cell radio access nodes currently provide, or will in the future provide, necessary infrastructure for wireless services. For instance, it has been contemplated that fifth-generation mobile networks (i.e., 5G networks) will utilize small cells to provide continuous or near continuous 5G coverage, especially in urban areas. Such small cells are envisioned to provide more efficient provisioning of spectrum to users of mobile computing devices and enable data reception in virtually all environments. Accurately determining the location of such small cells will become critical to the operation thereof. As such, it is contemplated that small cells will incorporate GNSS technologies for use in locating the small cells in connection with provision of wireless services such as data communication, voice communication, and the like.

Regardless of the specific context in which GNSS services are utilized, it may be that a receiver may have difficulty in acquiring sufficient positioning system signals to determine a location of the receiver. A number of conditions may exist that present such difficulty. Such conditions may limit the number of signals that may be acquired and/or the strength of such signals. For instance, often times a receiver may be located within (i.e., imbedded within) a building. Such receivers that are imbedded within a building may experience high attenuation of signals as signals must pass through the building materials surrounding the receiver. Furthermore, such in-building or imbedded receivers may be located in highly urbanized areas. In such contexts, in addition to high attenuation of positioning system signals, the signals may also experience multipath propagation of signals and/or experience reflection of signals, among other conditions in the urban environment that make signal acquisition difficult.

Some prior approaches have utilized data received through connections to asynchronous packet-switched networks (e.g., WANs, the Internet, etc.) to supplement and/or replace one or more GPS signals to fix a position of a receiver connected to the network(s). For instance, a number of such solutions are described in U.S. Pat. No. 7,961,717, entitled "System and Methods for IP and VoIP Device Location Determination," assigned to the assignee of the present application, and incorporated herein in its entirety.

To increase position fixing accuracy as well as performance and capacity, in-building receiver devices like LTE base stations, positioning system receivers, VoIP phones, small cell nodes, picocell nodes, or the like may need to be time synchronized as variations in the frequency and/or phase in the local time base for such devices can lead to performance degradation or malfunctions. Prior approaches to synchronization of the local time base of network-connected devices sometimes include the use of network synchronization techniques that rely on communication over the network to which the device is connected. For instance, the precision time protocol (PTP or IEEE 1588) includes a packet system, which provides for time and frequency information derived from an Internet connection.

FIG. 1 presents a schematic diagram of an End to End PTP system 100 according to the prior art while FIG. 2 presents a PTP timing packet flow such as in the system illustrated in FIG. 1. Generally, any appropriate grandmaster device 104 that has the ability to obtain accurate timing signals from GPS 112 (or otherwise be synchronized to any appropriate accurate clock/oscillator) generates and sends an initial synchronization (sync) message or packet 204 at a time $t_1$ (on the grandmaster time base) over the Internet 110 (or other asynchronous packet-switched network made up of multiple routers, switches, and other devices) to a receiver device 108 (e.g., slave, client, etc.). Upon receipt of the sync packet 204, the receiver device 108 records the time (on the local receiver time base) that the sync packet 204 was received at the receiver device (at a time "$t_2$" in this example) and records the same in any appropriate data store 220 (e.g., memory, etc.). In the event that the sync packet 204 is not stamped with the time the grandmaster device 104 may send a follow up message or packet 208 that contains the value of $t_1$ which may be received by the receiver device 108 and stored in the data store 220.

The receiver device 108 may also send a "delay request" message or packet 212 at a time $t_3$ (on the local receiver time base) over the Internet 110 to the grandmaster device 104 which may be received by the grandmaster device 104 at a time $t_4$ (on the grandmaster time base). The grandmaster device 104 may then send a "delay response" message or packet 216 that contains the value of $t_4$ which may be received by the receiver device 108 and stored in the data store 220 along with the value of $t_3$. The above packet exchange may be performed multiple times per second (e.g., 64 times per second or the like) and the values of $t_1$, $t_2$, $t_2$, and $t_4$ may be manipulated in various manners to obtain frequency and phase corrections that may be made to the pulse per second (PPS) or other timing signal of the oscillator of the receiver device 1080 to synchronize the local receiver time base to the grandmaster time base (and thus that of GPS).

To recover frequency, the $t_1$ and $t_2$ values of adjacent (i.e., adjacent in time) sync packets 204 may be manipulated as follows to obtain a measure of a frequency error for each adjacent sync packet pair:

$$\frac{[t_2(n+1) - t_1(n+1)] - [t_2(n) - t_1(n)]}{(t_1(n+1) - t_1(n))} = \frac{\Delta f}{f}$$

If the error or difference between $t_2$ and $t_1$ for each packet is defined as $t_e(n)$, then the above frequency error ratio for each adjacent packet pair can be written as follows:

$$\frac{t_e(n+1) - t_e(n)}{t_1(n+1) - t_1(n)} = \frac{\Delta f}{f}$$

The value of $$\frac{\Delta f}{f}$$

may be a dimensionless quantity (e.g., such as parts per billion or ppb) that provides an indication of the relative frequency error of the oscillator of the receiver device 108. For instance, it may generally be known that for each 10 ppb of frequency stability, there is 10 nanoseconds of frequency error for every one second of time.

When the difference in the numerator is zero, then the frequency error is also zero. Also, if the numerator and the denominator are constant from packet pair to packet pair, the frequency may be non-zero but nevertheless constant. In the case where there is variability in the ratio from packet pair to packet pair, an average of $t_e(n+1)-t_e(n)$ for a plurality of packet pairs may be obtained and the average of the ratio may be obtained. However, an increase in the variability of $t_e$ between adjacent packet pairs reduces the accuracy of the computed frequency error. Furthermore, it does not take much for a small difference in $t_e$ between adjacent packet pairs to create large frequency errors. For example, if the difference in delay is 1 pec and the packet rate is a typical 64 packets per second, the frequency error is 64000 ppb which is well off of a hypothetical target of 50 ppb.

One manner in which existing systems attempt to address the above problem is through use of a phase look loop (PLL). A PLL is effectively an "averager" that can remove large $t_e$ outliers among a plurality of $t_e$ for a plurality of packet pairs. However, PLLs often do not typically affect the average frequency as the majority of the $t_e$ values are small.

To recover time through the use of the PTP packets, the $t_1$, $t_2$, $t_2$, and $t_4$ values of a plurality of packet exchanges (e.g., where each packet exchange includes a sync packet 204, a follow up packet 208, a delay request packet 212, and a delay response packet 216) may be manipulated as follows to obtain round trip delay (RTD) values ($T_{rtd}$) and corresponding time offset values ($T_{offset}$) that can be used to adjust or correct the phase of the timing signal maintained by the receiver device 108:

$$Trtd = (T2 - T1) + (T4 - T3)$$
$$Toffset = \frac{(T2 - T1) - (T4 - T3)}{2}$$

However, there can be large variations in $T_{rtd}$ and $T_{offset}$ among a plurality of PTP packet exchanges due to the variations in processing times, nodes or hops in the paths that the PTP packets take between the grandmaster and receiver devices 104, 108, timing jitter, and the like. One manner in which existing systems attempt to address the above problem is through use of a low pass filter (e.g., PLL) or the like where all of the $T_{offset}$ values for a series of PTP packet exchanges over time are averaged while removing selected $T_{offset}$ value outliers. However, this method causes a continuous variation of the time or phase as measured by a generated PPS signal and can take a long time for the system to converge and provide a $T_{offset}$ value. Many receivers such as LTE systems and the like may not perform well if the time is continuously varying as this can result in GPS signals never being acquired.

Furthermore, it can sometimes be difficult to transfer microsecond grade (or finer) time from a grandmaster device or other source to a receiver device via the open Internet with large time uncertainties, time jitter, and the like for purposes of assisting a GPS fix. For instance, path asymmetries may be so large that they are out of the GPS time search range and time jitter may be beyond the available search range of the system causing even stepped or ring systems to produce suboptimal results. Still further, network routes can change dynamically causing instant changes in time transfer (e.g., which may be undetectable by current systems).

SUMMARY

In view of at least the foregoing, disclosed herein are various utilities that determine one or more timing (phase) and/or frequency corrections to be made to a local time base of a receiver device to synchronize the local time base with the time of GPS or other highly accurate time base. As will be discussed in more detail herein, the present utilities receive timing packets from one or more grandmaster devices (devices whose time bases are substantially the same as that of GPS or the like) and/or positioning system signals (GPS signals) directly from a positioning system (e.g., GPS satellites) and manipulate such received data to determine the timing and/or frequency corrections to be made to the local time base (e.g., a PPS signal generated by the local clock). The present utilities advantageously allow for the synchronization of the local time base of a receiver device to GPS or another accurate time base even when a sufficient number of channels (e.g., four) from the receiver device to GPS or other positioning system satellites are unavailable to (e.g., such as when a receiver device is disposed within a building with increased levels of GPS signal attenuation). Furthermore, such time and frequency corrections can be obtained without necessarily requiring substantially continuous measurements and updated corrections over long or indefinite periods of time. The resulting synchronized local time base of the receiver or slave device allows for more accurate position fixing and the like.

In one broad aspect disclosed herein, the present utilities make use of the delay values of PTP packets or packet exchanges (e.g., "lucky" packets) that are lower than those of other PTP packets or packet exchanges in a series of PTP packets or packet exchanges in various manners to adjust the frequency and/or phase of the local time base maintained by the receiver device so that the clock of the receiver device is more closely synchronized to the grandmaster time base (and thus that of GPS). As will be appreciated with reference to the discussion herein, the disclosed utilities avoid or at least reduce the use of larger delay values which tend to introduce more uncertainty into recovered frequency and time.

In one embodiment, a linear regression or curve fit of a plot of time delay (e.g., difference between $t_2$ and $t_1$ or $t_e(n)$) versus launch time (e.g., $t_1$) for a plurality of lucky packets over a time span of packets can be determined and then its slope equated to a frequency estimate that can be used to adjust the frequency component of the local receiver time base or obtain one or more further refined frequency estimates to do the same. More specifically, a plurality of PTP sync packets (e.g., sync packets 204) may be launched from a grandmaster device (e.g., grandmaster device 104) to a receiver device (e.g., receiver device 108) via the Internet or other asynchronous packet-switched network at any particular rate (e.g., 30 or 60 packets per second) over any particular time period, where the time delay and launch time may be determined and recorded for each PTP sync packet for over the time period. Each pair of time delay and launch time for a respective sync packet may be referred to as a "doublet". Thereafter, the time period can be divided into a plurality of intervals or windows, where each interval includes a particular number of packets (e.g., 16, 32, etc.). The intervals may be non-overlapping or partially overlapping.

For each interval, the respective doublet of at least one lucky packet (e.g., the packet in the interval having the lowest time delay) may be selected such that the doublets of the lucky packets of all of the intervals collectively make up a subset of all of the doublets of the PTP sync packets sent from the grandmaster device to the receiver device over the time period. A linear regression may then be calculated using the time delays and launch times of the doublet subset and used to adjust the frequency of the oscillator of the receiver device (e.g., such as with a digital to analog converter (DAC) or the like).

In one arrangement, the slope of the determined linear regression can be equated to a frequency estimate that can be used to adjust the frequency component of the local receiver time base. For instance, in the case where the slope of a determined linear regression was 2 μsec, the frequency can be adjusted to ½ μsec or in other words 0.5 MHz.

In another arrangement, doublets having time delays that are more than a particular threshold time delay away from the linear regression may be removed from the doublet subset and then a subsequent linear regression may be calculated whose slope may provide a more accurate indication of the frequency recovery. At each respective launch time value (i.e., $t_1$) on the plot, it can be determined whether an absolute value of the time delay of the doublet at such launch time is greater than a sum of the time delay of the linear regression at such first time and the threshold time delay. Any doublets whose time delay absolute values are greater than such sum may be removed from the doublet subset and then another linear regression of the remaining doublets may be determined.

Such culling and removing of doublets and determination of further linear regressions may be repeated any appropriate number of times (with successively reduced threshold time delays) and/or until the occurrence of any appropriate event. For instance, the repeating may occur until one of the reduced threshold time delays is less than a minimum reduced threshold delay, the number of doublets in the subset is less than a minimum number of doublets, the number of doublets in the subset is a particular number, the repeating has occurred more than a threshold number of times, a difference between a slope of one further linear regression and a slope of a previous further linear regression is less than a maximum difference, and/or the like. The slope of one or more of (e.g., the final) the linear regressions may be utilized to adjust the frequency of the PPS or other signal generated by the oscillator of the receiver device.

In another embodiment, the delay values of one or more PTP lucky packets are manipulated in various manners to obtain slave or receiver device time offsets that may be used to adjust the time or phase of the local time base maintained by the receiver device (e.g., shifting pulse edge) so that the clock of the receiver device is more closely synchronized the grandmaster time base (and thus that of GPS). Once a receiver device offset value is determined and local time base corrected with the same, the receiver device may maintain the same corrected time base with the same offset for an extended period of time (e.g., without having to continue to obtain measurements, determine subsequent receiver device offset values, and correct the receiver device PPS signal) which more readily allows for acquisition of GPS signals and subsequent location fixing of the receiver device.

More specifically, a successive plurality of PTP packet exchanges between a grandmaster device and a slave or receiver device may be generated via the Internet or other asynchronous packet-switched network at any particular rate (e.g., 30 or 60 packets per second) over any particular time period. The $t_1$, $t_2$, $t_3$, and $t_4$ values for each packet exchange may be manipulated as discussed previously to generate a round trip delay (Ltd) value and a corresponding time offset ($T_{offset}$) value for the packet exchange. The $T_{rtd}$ and $T_{offset}$ values for each packet exchange may be referred to as a "doublet."

After loading the plurality of doublets into a data register (e.g., processor register, memory buffer, etc.), the doublets may be ordered according to $T_{rtd}$ by starting with the doublet having the smallest $T_{rtd}$ of all of the plurality of doublets and continuing to the doublet having the largest $T_{rtd}$ of all of the plurality of doublets. Each particular $T_{offset}$ value remains with its respective $T_{rtd}$ value before and after the ordering step. After the ordering step, the $T_{offset}$ values (stated differently, estimated time offset values) of a portion or subset of the doublets including the doublet with the smallest $T_{rtd}$ value may be manipulated in one or more manners to obtain a receiver device offset value that may be used to update the local time base of the receiver device (e.g., by shifting or correcting the phase of the PPS signal generated by the clock of the receiver device by the receiver device offset value). Stated differently, a portion of the doublets including the doublet having the largest $T_{rtd}$ value of all of the doublets may be removed from the data register and then the $T_{offset}$ values of the doublets remaining in the register may be manipulated to obtain the receiver device offset value.

In one variation, the $T_{offset}$ values of the remaining doublet subset may be averaged such that the receiver device offset value is an average of the $T_{offset}$ values of the remaining doublet subset. In the case where the lowest $T_{offset}$ value is not associated with the lowest $T_{rtd}$ value in the remaining doublet subset, the obtained average can outperform merely utilizing the $T_{offset}$ value of the doublet with the lowest $T_{rtd}$ value (e.g., as the peak to peak error or range may be reduced over all of the data analyzed).

One or more outlying doublets in the remaining doublet subset may be removed in any appropriate manner to further refine and improve the determined receiver device offset value. For instance, a standard deviation of the $T_{offset}$ values (e.g., the estimated time offsets) of the remaining doublets subset may be determined. Thereafter, it may be determined, for each doublet in the remaining doublet subset, whether an absolute value of the $T_{offset}$ value of the doublet less the average of the $T_{offset}$ value is greater than any appropriate multiple of the standard deviation (e.g., 1, 2, 3, etc.). Any doublets associated with a positive answer to the above determining step may be removed from the remaining doublet subset and then the average of the $T_{offset}$ value may be again determined.

In another variation, the data register may be initially (i.e., before the ordering step) divided into a plurality of intervals, where each interval includes doublets associated with packet exchange launch times (e.g., $t_1$ values) within a different respective time interval (e.g., interval 1: 0-1 sec; interval 2: 1-2 sec; etc.). Thereafter, the doublets in each respective interval may be ordered according to $T_{rtd}$ by starting with the doublet having the smallest $T_{rtd}$ of all of the doublets in the interval and continuing to the doublet having the largest $T_{rtd}$ of all of the doublets in the interval. For each interval, an average of the $T_{offset}$ values of a remaining doublet subset that includes at least the doublet having the smallest $T_{rtd}$ of all of the doublets in the interval and not the doublet having the largest $T_{rtd}$ of all of the doublets in the interval may be determined. The $T_{offset}$ value averages for each of the intervals may be manipulated (e.g., averaged) to obtain the receiver device offset value. Again, one or more selected outlying doublets in the remaining doublet subset in each interval may be removed in any appropriate manner to further refine and improve the determined receiver device offset value.

In another arrangement, doublets in the remaining doublet subset (i.e., after the ordering step) may be divided into a plurality of intervals, where each interval includes a particular number of adjacent doublets (e.g., interval 1: the first thirty doublets; interval 2: the next thirty doublets; etc.). First and second doublets may be identified in each interval, such as the doublet having the largest $T_{offset}$ value of all of the doublets in the interval and the doublet having the smallest $T_{offset}$ value of all of the doublets in the interval. A plot of $T_{offset}$ value versus $T_{rtd}$ value for the first and second doublets of all of the intervals may be generated and then first and second linear regressions may using the $T_{offset}$ values of the first doublets of all of the intervals and the $T_{offset}$ values of the second doublets of all of the intervals, respectively, may be determined. An intersection of the first and second linear regressions may provide an estimated time offset value that may be used to determine the receiver device offset value.

In one variation, respective linear regression intersection values for a plurality of different windows may be determined and manipulated (e.g., averaged) to obtain the receiver device offset value. As an example, the above-determined linear regression intersection value may be determined using doublets corresponding to a first window, where the first window includes doublets having launch times (i.e., $t_1$ values) within a first window of time (e.g., 0-1 min). Thereafter, the above steps of loading doublets into a data register, ordering the doublets, identifying a reduced doublet subset and dividing the same into intervals, and determining a linear regression intersection value may be determined for each of one or more of a second or additional windows of time (e.g., 1-2 min, 2-3 min, etc.). In one arrangement, the various time windows may be interleaved (e.g., 0-1 min, 30 s-90 s, 1 min-2 min, 90 s-150 s, etc.). In contrast to previous techniques involving the averaging of $T_{offset}$ values of all packet exchanges over a period of time which results in a continuous variation of the time or phase and long periods of time for system converge to provide a $T_{offset}$ value, the disclosed utilities allow for the use of reduced amounts of PTP data over shorter periods of time to obtain receiver device offset values that are as good as or better than those of previous techniques.

In another aspect disclosed herein, the time or phase of the local time base maintained by the receiver device may alternatively or additionally be synchronized with a grandmaster time base using GPS signals received at the receiver device and attempted correlations of corresponding signals generated by the receiver device with the received GPS signals. Broadly, the receiver device may generate, at each of a plurality of different respective time offsets relative to a reference time of the local time base of the receiver device, a pseudo random number (PRN) sequence (e.g. gold code) of a known GNSS satellite. Upon correlation of a particular one of the generated PRN sequences with a received PRN sequence from the known GNSS satellite, the time offset of the particular generated PRN sequence relative to the reference time of the local time base may be used to update or correct the local time base of the receiver device so that it is synchronized with the grandmaster time base (or in other words GPS time).

Generally, a time offset search space relative to an initial starting or reference time of the receiver device may initially be "tiled" or in other words divided into a plurality of windows or rings until a full GPS epoch (e.g., 1 ms) has been reached. For instance, frequency may be extracted from PTP packets as disclosed herein to correct the oscillator of the receiver device and then the internal clock of the receiver device may be corrected (e.g., using a divider or PLL) after tuning of the oscillator. A residual digital frequency error will typically nevertheless remain even after correcting of the internal clock.

An initial ring may be in the form of a particular span of time (e.g., 40 μs) that is centered on the initial starting reference time such that the first ring starts at a negative half span (e.g., −20 μs) and ends at a positive half span (e.g., +20 μs). In the initial ring, the PRN sequence of the particular GNSS satellite may be generated starting at the beginning of the ring (e.g., at −20 μs) and then a plurality of times thereafter (e.g., every 1 ns or the like) until the end of the ring has been reached. For each generated PRN sequence, the disclosed utilities may attempt a correlation (e.g., an autocorrelating of a generated PRN sequence) with a received PRN sequence from the particular GNSS satellite. For instance, this process may include utilizing a plurality of non-coherent integrations (NCIs).

In the event that a correlation is made, the offset between the starting time of the particular generated PRN sequence and the initial reference time may be used to shift the leading pulse edge of the local time base of the receiver device (e.g., or in other words "skew the clock"). Thereafter, positioning signals from one or more GNSS satellites may be acquired by the receiver device and then an attempt to fix the position of the receiver device using the acquired GNSS signal(s) and the synchronized local time base of the receiver device may be initiated.

If a correlation is not made in the initial ring, then PRN sequences may be generated and correlations determined for one or more second windows (e.g., second ring) of time relative to the initial reference time. For instance, the second ring may include a first window that begins at or approximately at a negative full span (e.g., at/near −40 μs in the above example) and ends at or near a negative half span (e.g., at/near −20 μs in the above example) and a second window that begins at or near a positive half span (e.g., at/near 20 μs in the above example) and ends at or near a positive full span (e.g., at/near 40 μs in the above example). Again, the PRN sequence of the particular GNSS satellite may be generated each of a plurality of times within the ring and correlations between each generated PRN sequence and corresponding PRN signals acquired by the receiver device may be attempted. Additional such rings may be appropriately searched and correlations attempted until a correlation is made.

Various network asymmetries may be taken into account in a number of manners to facilitate probing the search space to obtain accurate receiver device time offset values. For instance, adjacent rings may be overlapped by an appropriate amount of time that accounts for local oscillator drift in the receiver device (e.g., to avoid missing a correlation that would otherwise result but for such residual frequency error).

In some situations, network jitter may allow for time recovery with low variance, where a fixed mean time error causes small variations (e.g., less than 2 μs) within PTP session to PTP session. In this case, adjacent rings may be overlapped by an amount of time greater than the error induced by such network jitter (e.g., 2 μs). For instance, rather than the above-discussed second ring spanning from −40 μs to −20 μs and then from 20 μs to 40 μs, the second ring may span from −38 μs to −18 μs and then from 18 μs to 38 μs so as to overlap the first ring by 2 μs. To attempt to keep approximately the same absolute PPS error between rings, a PTP session (e.g., 30 seconds) may be run before each respective ring is searched so as to reset the initial reference time of the receiver device.

In any case, restarting PTP for each adjacent ring thus resets local oscillator drift for each ring to limit such drift from accumulating across rings. Before searching the rings, the receiver device may be placed into "holdover" which means that the receiver device is severed from the network (e.g., Internet). Placing the receiver device into holdover fixes the residual time error such that the network jitter becomes zero for the remainder of the search.

In other situations, network jitter can make it difficult or impossible to recover the same time with the same error. For instance, given a perfect local oscillator, jitter may be considered large if the absolute value of the difference between a time offset measured at a first time and time offset measured at a later time is greater than 100 μs. In this case, PTP may be restarted once before searching the first ring to recover time and then maintain the system in holdover while searching the rings. As local oscillator drift (frequency drift) may thus accumulate across adjacent rings, the rings may be overlapped by an amount of time that takes into account such anticipated accumulation.

Any of the embodiments, arrangements, and the like discussed herein may be used (either alone or in combination with other embodiments, arrangement, and the like) with any of the disclosed aspects. Any feature disclosed herein that is intended to be limited to a "singular" context or the like will be clearly set forth herein by terms such as "only," "single," "limited to," or the like. Merely introducing a feature in accordance with commonly accepted antecedent basis practice does not limit the corresponding feature to the. Moreover, any failure to use phrases such as "at least one" also does not limit the corresponding feature to the singular. Use of the phrase "generally," "at least generally," "substantially," "at least substantially" or the like in relation to a particular feature encompasses the corresponding characteristic and insubstantial variations thereof. Finally, a reference of a feature in conjunction with the phrase "in one embodiment" or the like does not limit the use of the feature to a single embodiment.

Reference will now be made to the following drawings which assist in illustrating the various pertinent features of the various novel aspects of the present disclosure.

DETAILED DESCRIPTION

Figure 1:
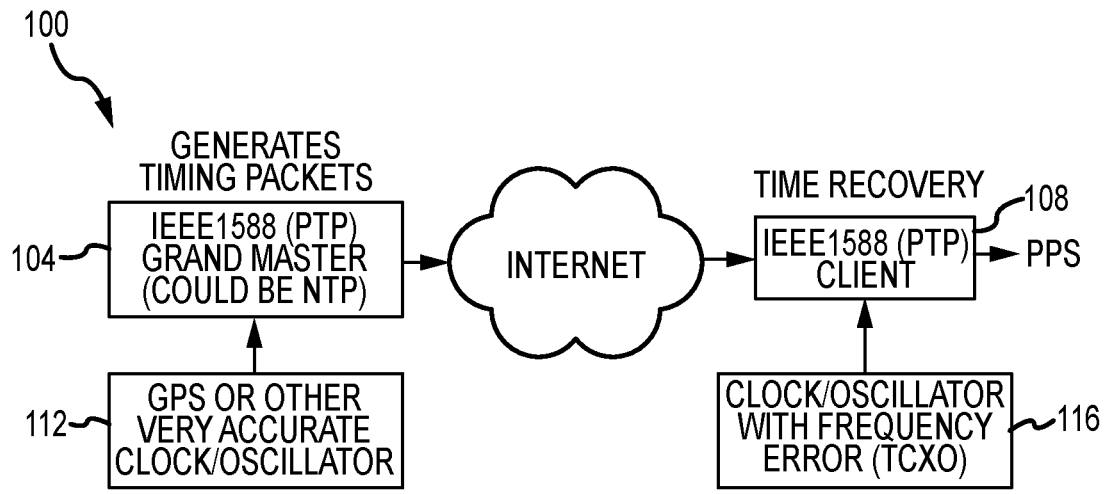
FIG. 1 presents a schematic diagram of an End to End PTP system according to the prior art.

While the disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

Figure 3:
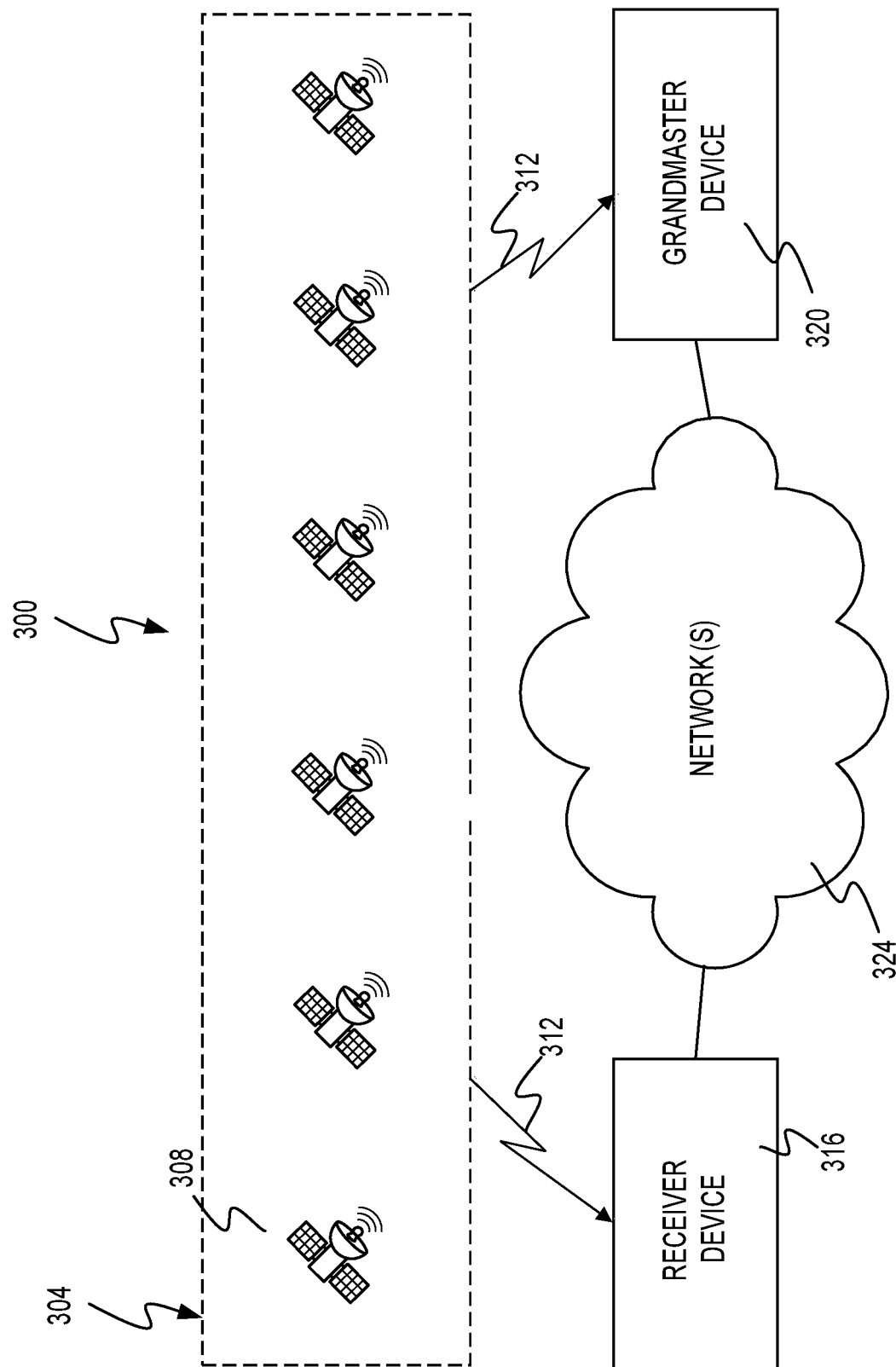
FIG. 3 presents a schematic illustration of a system for use in synchronizing a local time base of a receiver device with that of a GNSS system.

FIG. 3 presents a schematic diagram of a system 300 for use in synchronizing a local time base of a slave or receiver device 316 (e.g., VoIP phone, LTE base station, positioning system receiver, etc.) with that of a positioning system 304 via at least one Grandmaster device 320 (e.g., IEEE1588V2 Grandmaster) according to one embodiment. The positioning system 304 may broadly be any system that transmits signals 312 that can be received by the receiver device 316 and Grandmaster device 320 and thereafter used to determine a location of the receiver device 316. Such a positioning system 304 may include a plurality of GPS satellites 308 operable to generate GPS signals 312 (e.g., PRN sequences). It is to be understood however that the positioning system 304 may in other embodiments include other GNSS systems such as those currently deployed by the European Space Agency and Russian and Japanese governments (e.g., Galileo, Glonass, and QZSS respectively) or like. Alternatively or in conjunction with a GNSS system, ground-based transmitters could also be used.

The receiver device 316 and grandmaster device 320 may communicate over one or more networks 324. The one or more networks 324 may generally be any computer network capable of linking the receiver device 316 to the grandmaster device 320 as well as various other components, servers and the like. Of particular note is the system's ability to function while interconnected across asynchronous, packet-switched networks. Indeed, the system's ability to function using the Internet to interconnect various components of the system is of significant benefit. Although in general, embodiments discussed herein will be described as communicating over the Internet, it should be appreciated that the system is capable of communicating over other types of computer networks and that the use of the Internet in the description should be considered exemplary and not limiting.

Figure 4:
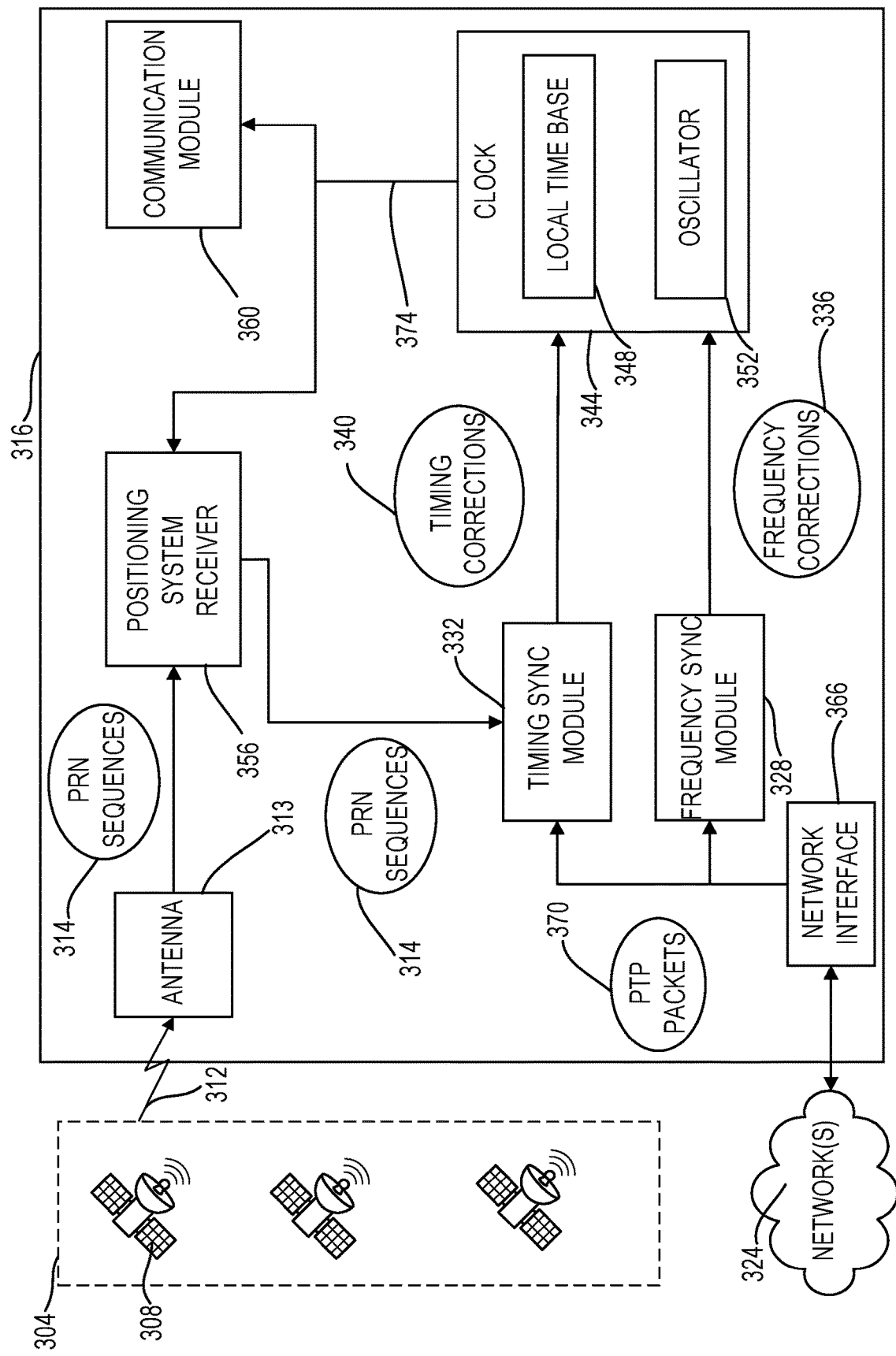
FIG. 4 presents a more detailed illustration of the receiver device of FIG. 3 and illustrates a process of calibrating the time and frequency of the local time base of the receiver device via manipulation of PTP packets received over one or more asynchronous networks and signals received from a positioning system.

FIG. 4 presents a more detailed illustration of the receiver device 316 of FIG. 3 and schematically illustrates a process of synchronizing the time (i.e., phase) and frequency of a local time base 348 of the receiver device 316 to be closely aligned with the time base of GPS or other highly accurate time base in a manner that avoids or at least reduces the use of larger delay values which tend to introduce more uncertainty into recovered frequency and time.

As shown, the receiver device 316 includes an internal or local clock 344 that includes any appropriate local oscillator 352 (e.g., calibrated single or dual crystal oscillator, voltage controlled oscillator, or the like) that generates a periodic, oscillating electrical signal. In conjunction with the electrical signal produced by the oscillator, the clock 344 maintains the local time base 348 and generates a corresponding timing signal 374 that is sent to a positioning system receiver 356 configured to establish a location of the receiver device 316, a communication module 360 configured to send the timing signal to one or more other devices (e.g., LTE base stations, etc.), and the like. Because each of the frequency and phase of the clock 374 may collectively define the local time base 348 each of the frequency and phase of the clock 374 may be controlled independently, the local time base 348 may be defined by a frequency portion and a phase portion. That is, the frequency portion may refer to the resulting frequency of the timing signal 374 output from the clock 344 and the phase or timing portion may refer to the resulting phase of the timing signal output from the clock 344.

Broadly, the receiver device 316 includes a frequency sync module 328 that is configured to receive PTP packets 370 from grandmaster device 320 over network(s) 324 via a network interface 366, manipulate the PTP packets 370 or information derived/obtained therefrom to determine frequency corrections 336 to be made to the frequency portion of the timing signal 374, and send the frequency corrections 336 to the clock 344 for correction of the frequency portion of the timing signal 374. The receiver device 316 also includes a timing sync module 332 that is configured to exchange PTP packets 370 with the grandmaster device 320 over network(s) 324, manipulate the PTP packets 370 or information derived/obtained therefrom to determine timing corrections 340 to be made to the phase portion of the timing signal 374, and send the timing corrections 340 to the clock 344 for correction of the timing or phase portion of the timing signal 374. The frequency sync module 328 and timing sync module 332 may receive PTP packets from or exchange PTP packets with the same grandmaster device 320 or different grandmaster devices 320 and store PTP packet data (e.g., time stamps, etc.) in any appropriate memory or storage location in any appropriate format (e.g., binary, ASCII, etc.). While illustrated as two separate modules, it is to be understood that functionality of the frequency sync module 328 and timing sync module 332 may be incorporated into a single module or more than two modules either as part of the receiver device 316 or separate from the receiver device 316 (where, in the latter case, the frequency and timing corrections 336, 340 would be sent to the clock 344 of the receiver device 316 in any appropriate manner).

Although not specifically shown, the receiver device 316 may include any appropriate housing inside which one or memory devices (e.g., RAM or other volatile memory storing computer readable instructions), one or more processor devices (e.g., processors, processor cores, etc.) for executing computer readable instructions from the memory module, and one or more storage devices (e.g., flash or other non-volatile memory), and one or more various other peripheral devices or components, all of which may be electrically interconnected by any appropriate structure of busses. In this regard, various ones of the components of the receiver device 316 (e.g., frequency sync module 328, timing sync module 332, etc.) may be implemented as one or more sets of such computer readable instructions for execution by the one or more processor devices.

Figure 5:
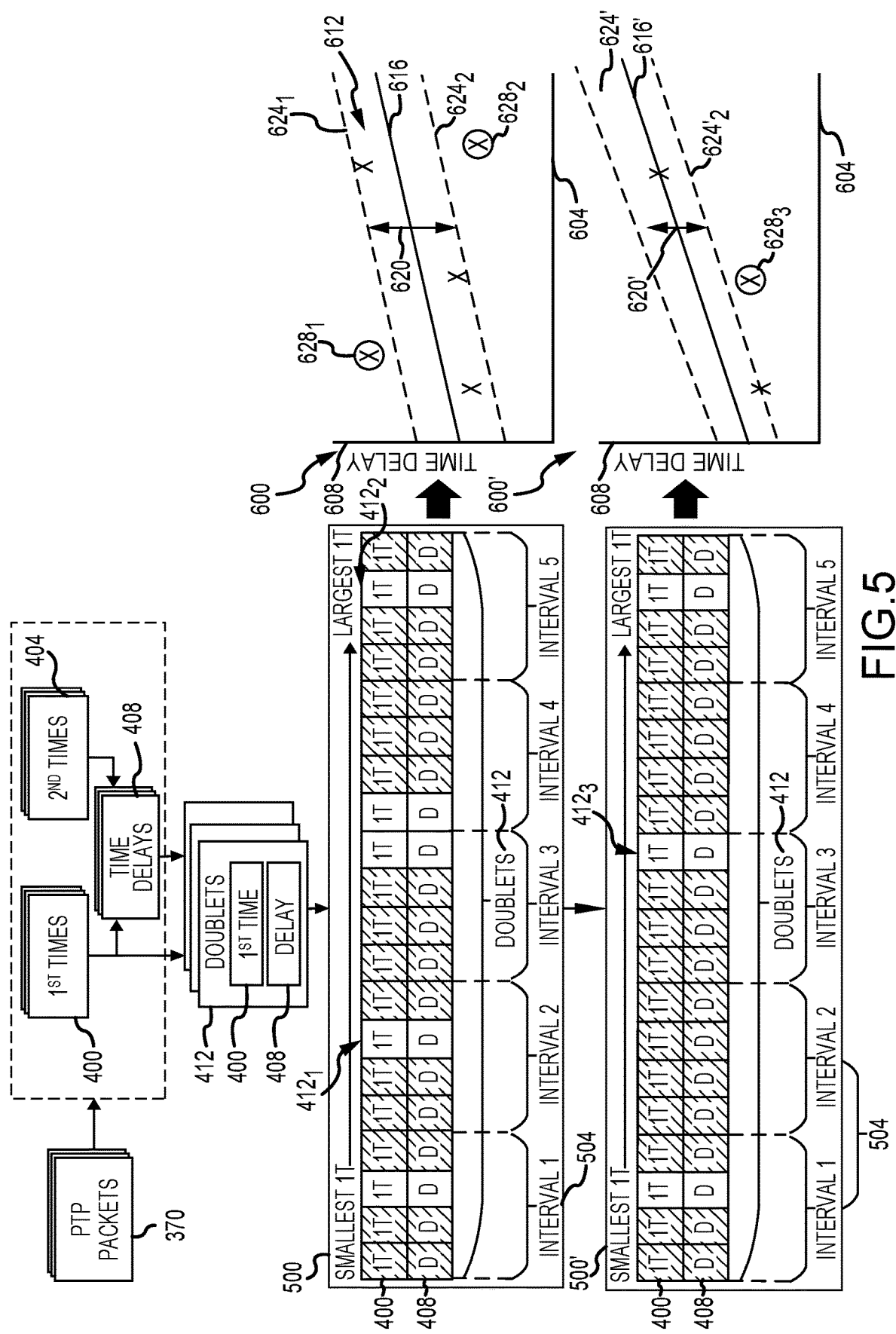
FIG. 5 illustrates a process of manipulating PTP packets received at a receiver device to determine a frequency correction to be made to a local time base of the receiver device.

With additional reference now to FIG. 5, a schematic diagram of a process of manipulating PTP packets 370 received at the receiver device 316 to determine frequency corrections 336 to be made to the local time base 348 of the receiver device 316 is presented (e.g., as may be implemented by frequency sync module 328). In conjunction with FIG. 5, reference will also be made to FIGS. 11-12 which present a flow diagram of a method of manipulating the received PTP packets 370 to determine frequency corrections 336 to be made to the receiver device 316.

Figure 2:
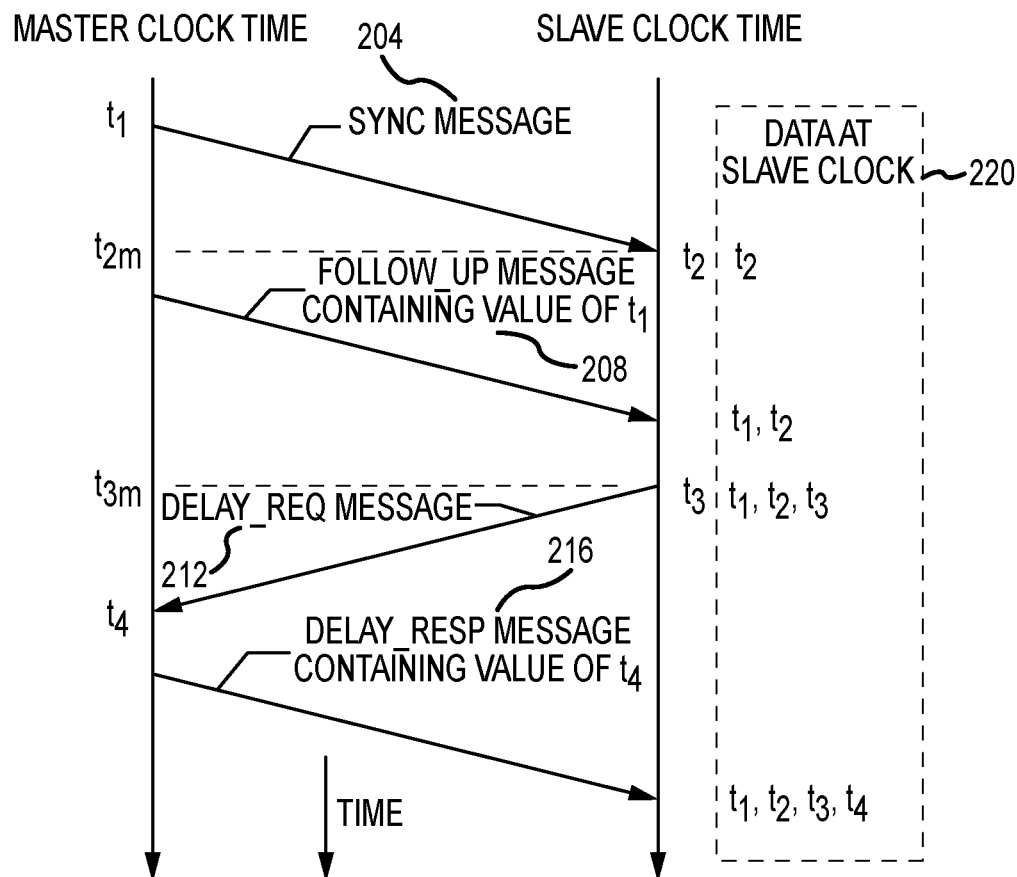
FIG. 2 presents a PTP timing packet flow involving the system illustrated in FIG. 1.

For each of a plurality of PTP packets 370 received at the receiver device 316 from grandmaster device 320, a first time 400 (e.g., time $t_1$ in FIG. 2) that the packet 370 left the grandmaster device 320 and a second time 404 (e.g., time $t_2$ in FIG. 2) that the packet 370 arrived at the receiver device 316 may be obtained (e.g., from time stamps) and recorded (e.g., in any appropriate data buffer, memory location, etc.) at step 1104. At 1108, a time delay 408 may be obtained and recorded for each packet 370 by determining a difference the first and second times 400, 404. For instance, the frequency sync module 328 may appropriately determine the time (e.g., according to the local time base 348) that each such packet 370 arrived at the network interface 366 and record the same as the second time 404 for the packet 370. In one arrangement, the grandmaster device 320 may generate and send for each packet 370 a follow up message (e.g., similar to follow up message 208 in FIG. 2) containing a value of the first time (time stamp) that the packet 370 left the grandmaster device (e.g., where the first time is according to the time base of the grandmaster device 320). In any case, the combination of the first time 400 and time delay 408 for each packet 370 may be considered a "doublet" 412, or in other words a set (e.g., group, pair, etc.) of data elements that describes the packet 370. See FIG. 5.

With additional reference again to FIG. 11, the method 1100 may then include loading 1112 the doublets 412 into a data register 500 (e.g., particular memory location) starting with the doublet 412 having the smallest (or earliest) first time 400 and continuing to the doublet 412 having the largest (or latest) first time 400. As each time delay 408 remains with its respective first time 400 in a particular doublet 412, the time delays 408 are not necessarily ordered from smallest to largest in the data register 500. The data register 500 may then be divided 1116 into a plurality of intervals 504, at least one doublet 412 may be selected 1120 from each interval 504, and a linear regression 600 may be calculated 1124 using the doublets 412 selected from the intervals 504. The linear regression 600 may be utilized to determine one or more frequency corrections 336 to be made to the local time base 348 of the receiver device 316 as discussed in more detail below.

In one arrangement, the data register 500 may be divided into the intervals 504 after the doublets 412 have been loaded therein as discussed above. In another arrangement, the data register 500 may be divided into intervals 504 before loading the doublets 412 into the data register. For instance, each interval 504 may include a number of cells or the like, where each cell is configured to receive an individual doublet 412 therein. In the simplistic example shown in FIG. 5, each interval is configured to receive or hold four doublets 412. In one variation, the intervals 504 may be configured to store the same number of doublets 412. In other variations, the intervals 504 may be configured to store differing numbers of doublet 412.

In one embodiment, the doublets 412 that are selected 1120 may be those having the smallest time delays 408 in each of the intervals 504. For instance, the non-shaded doublets 412 in the data register 500 of FIG. 5 may represent the doublets having the smallest time delay 408 in each of the intervals 504. As another example, the two or three (or additional) doublets have the smallest time delays 408 in each interval 504 may be selected 1120. In any event, the selected doublets 412 may form a subset of doublets 412 (i.e., a subset of all of the doublets 412 initially loaded into the register 500).

As shown in FIG. 5, the linear regression 600 may generally model a relationship between the first time 400 as the x-axis 604 and the time delay 408 as the y-axis 608 for the selected doublets, where the selected doublets are plotted as data points 612 in the linear regression model. For instance, the frequency sync module 328 may use any appropriate linear predictor function to generate a linear regression line 616 from the data points 612. In one arrangement, a slope of the linear regression line 616 may be determined or otherwise obtained and utilized as a frequency correction 336 to update the frequency portion of the local time base 348.

In another arrangement, one or more of the data points 612 may be removed from the analysis and another linear regression may be modeled so as to improve the accuracy of the frequency correction 336. As an example, and with reference now to FIG. 12, the method 1100 may include removing 1204 any doublets 412 from the subset (i.e., the selected doublets) that have time delays 408 (e.g., time delay absolute values) that are more than a first threshold time delay 620 away from a time delay of the linear regression line 616 at the first time 400 of such doublets 412. For instance, a first or upper threshold time delay line $624_1$ having the same slope as the linear regression line 616 may be plotted above the linear regression line 616 (where each point on the upper threshold time delay line $624_1$ is the particular first threshold time delay 620 away from the linear regression line 616 at the same first time 604) and a second or lower threshold time delay line $624_2$ having the same slope as the linear regression line 616 may be plotted below the linear regression line 616 (where each point on the lower threshold time delay line $624_2$ is the particular first threshold time delay 620 away from the linear regression line 616 at the same first time 604).

In the example illustrated in FIG. 5, it can be seen that data points $628_1$, $628_2$ corresponding to doublets $412_1$, $412_2$ fall outside of the upper and lower time delay lines $624_1$, $624_2$ and thus can be removed 1204 from the analysis. Another linear regression 600' may then be calculated 1208 using the first times 400 and time delays 408 of the subset of doublets 412 after the removing 1204 (e.g., with the non-shaded doublets 412 in the data register 500', where the data register 500' represents the state of the data register 500 after the removing 1204). At 1212, it may be queried whether further doublets are to be removed from the analysis. In response to a negative answer to the query 1212, the slope of the another linear regression (e.g., the linear regression 600') may be obtained 1216 and the slope utilized 1220 to adjust the frequency of the local time base 348 of the receiver device 316. In response to a positive answer to the query 1212, the method may proceed to remove 1224 any doublets 412 from the subset that have time delays 408 that are more than a reduced threshold time delay 620' (e.g., smaller than the first threshold time delay) away from a time delay of the linear regression line 616' at the first time 400 of such doublets 412. For instance, data point $628_3$ corresponding to doublet $412_3$ is outside of the upper and lower time delay lines $624_1'$, $624_2'$ and thus can be removed 1224 from the analysis. A further linear regression (not shown) may be calculated 1228 after the removing 1224, whereupon the method may proceed to again query whether further doublets are to be removed from the analysis.

In one arrangement, the further removing query 1212 may initially include querying whether the reduced threshold time delay (e.g., reduced threshold time delay 620' or a further reduced threshold time delay) is greater than a minimum reduced threshold time delay, where the removing 1212 proceed in response to such query. For instance, in the case where the reduced threshold time delay is still greater than the minimum reduced threshold time delay, a decision may be made to remove further doublets at 1212 and the method may then proceed to step 1224. Alternatively, if the reduced threshold time delay is not greater (e.g., smaller) than the minimum reduced threshold time delay, a decision may be made to instead proceed to step 1216. In one variation, the threshold time delay may be reduced by a particular factor during each removal step 1224 (e.g., such as a factor of ten), until the minimum reduced threshold time delay has been reached.

In another arrangement, the further removing query 1212 may alternatively or additionally include ascertaining whether the number of doublets 412 in the subset (i.e., in the subset after the removing 1204 or after the removing 1224) is greater than a minimum number of doublets (e.g., 2, 4, etc.), where the method may proceed to step 1224 in response to a positive determination or may proceed to step 1216 in response to a negative determination. In further arrangements, the further removing query 1212 may include determining whether the number of doublets in the subset is a particular number, whether the repeating has occurred more than a threshold number of times, or whether a difference between a slope of one further linear regression and a slope of a previous further linear regression is less than a maximum difference (e.g., all where the method may proceed to step 1216 in response to a positive determination or may proceed to step 1224 in response to a negative determination).

The determined frequency corrections 336 (e.g., the slope of the linear regression obtained in step 1216) may be used to correct or adjust the frequency of the local time base 348 in any appropriate manner. For instance, a digital to analog converter (DAC, not shown) may be used to vary an input voltage to the local oscillator 352 based on the received frequency corrections 336 so as to move the frequency of the local time base 348 closer to the time base of the grandmaster device 320 and thus closer to that of GPS or other highly accurate time base. As another example, one or more other modules or components may be utilized to adjust the frequency of the local time base 348 in view of the received frequency corrections 336 such as a PLL, a divider, and/or the like.

Any appropriate sample of PTP packets 370 may be obtained and utilized as discussed herein to determine one or more frequency corrections 336 to be made to the local time base 348. To reduce the duty-cycle on the grandmaster device 320 or other frequency source while increasing the accuracy of the method, one arrangement involves receiving PTP packets 370 from the grandmaster device 320 for one minute (a one minute "burst") followed by four minutes of silence, and repeating such five minute sequences a number of times. For instance, performing such five minute sequence four times (followed by a final one minute of the grandmaster device 320 sending PTP packets 370) would essentially allow for observation of the remote oscillator of the grandmaster device 320 as transmitted over the media (e.g., the Internet) over about twenty minutes while only requiring the grandmaster device 320 to send PTP packets 370 over five total minutes. Of course, other embodiments are envisioned as well such as one minute burst, two minute silence sequences; two minute burst, four minute silence sequences; and/or the like. In one variation, the grandmaster device 320 can be pinged by the receiver device 316 (e.g., via an Internet Control Message Protocol or ICMP ping) to verify that there has not been a network path change that may otherwise invalidate the integrity of the data collected during the above twenty minute (or other) time period.

Figure 6:
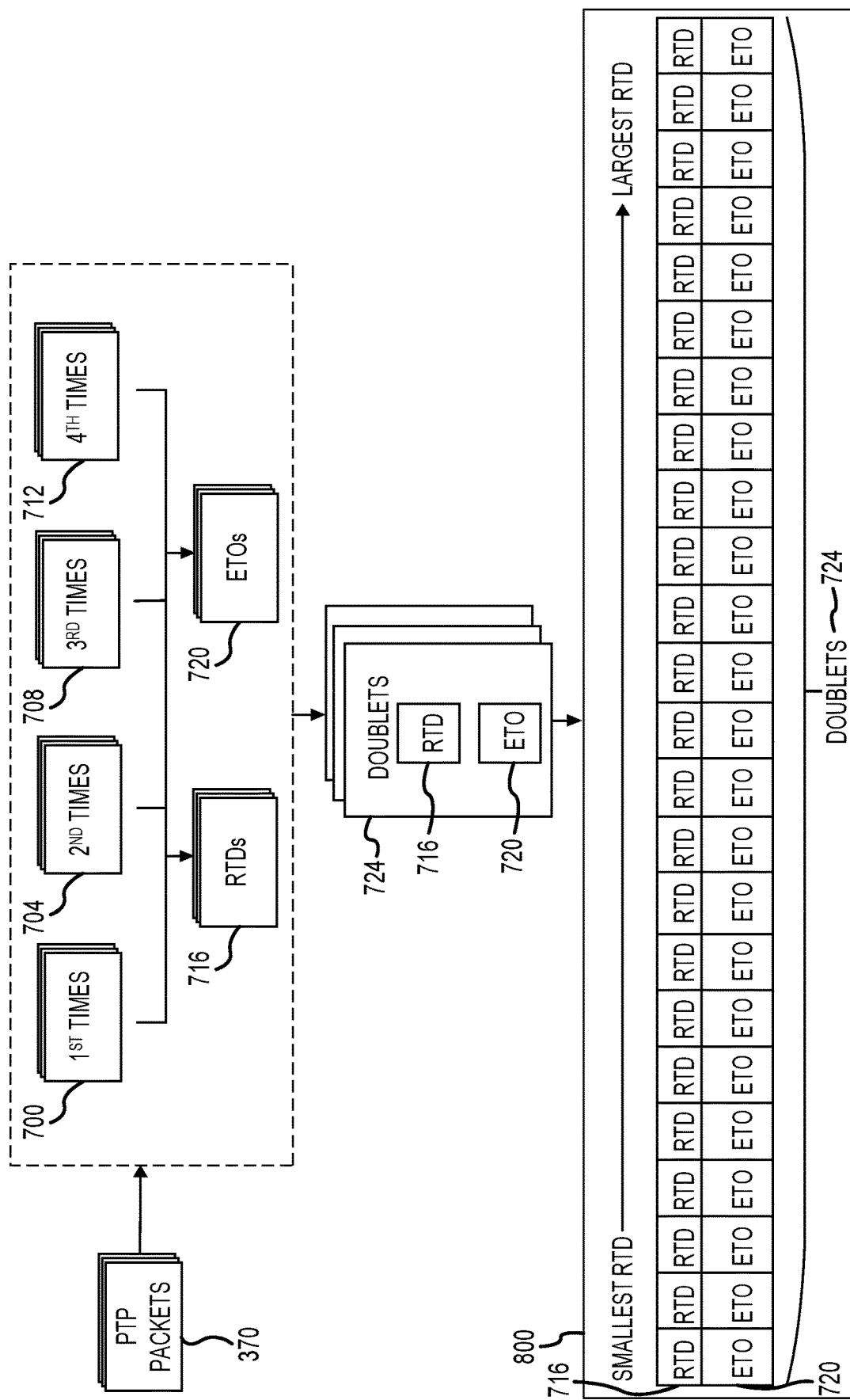
FIG. 6 illustrates a process of manipulating PTP packets received at a receiver device to determine a timing or phase correction to be made to a local time base of the receiver device, according to one embodiment.
Figure 13:
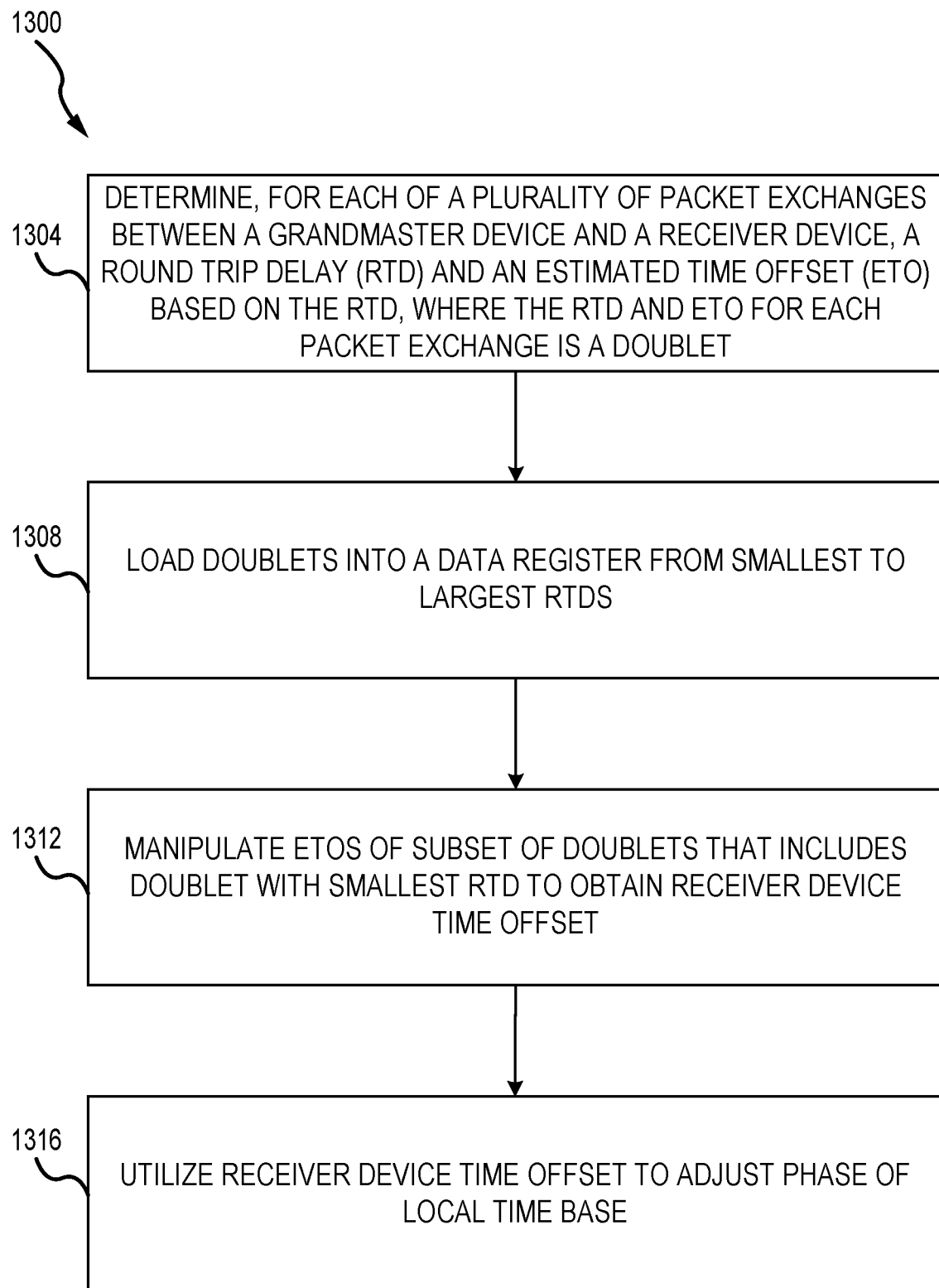
FIG. 13 illustrates a flow diagram of a method of manipulating PTP packets received at a receiver device to determine a timing or phase correction to be made to a local time base of the receiver device, according to one embodiment.

As discussed previously, the receiver device 316 also includes a timing sync module 332 that is configured to exchange PTP packets 370 with the grandmaster device 320 over network(s) 324, manipulate the PTP packets 370 or information derived/obtained therefrom to determine timing corrections 340 to be made to the phase portion of the timing signal 374, and send the timing corrections 340 to the clock 344 for correction of the timing or phase portion of the timing signal 374. With additional reference now to FIG. 6, a schematic diagram of a process of manipulating PTP packets 370 received at the receiver device 316 to determine timing or phase corrections 340 to be made to the local time base 348 of the receiver device 316 is presented (e.g., as may be implemented by timing sync module 332). In conjunction with FIG. 6, reference will also initially be made to FIG. 13 which presents a flow diagram of a method 1300 of manipulating the received PTP packets 370 to determine timing or phase corrections 340 to be made to the receiver device 316. As an example, receive device 316 may "skew the clock" or otherwise shift a leading pulse edge of the PPS timing signal 374 so as to align the PPS to the GPS Rx with the corrections determined by 332 and 328. For instance, the timing sync module 332 may generate and send a counter value to the clock 344 corresponding to a delay or phase shift needed to synchronization the local time base 348 with that of GPS or other highly accurate time base.

Figure 11:
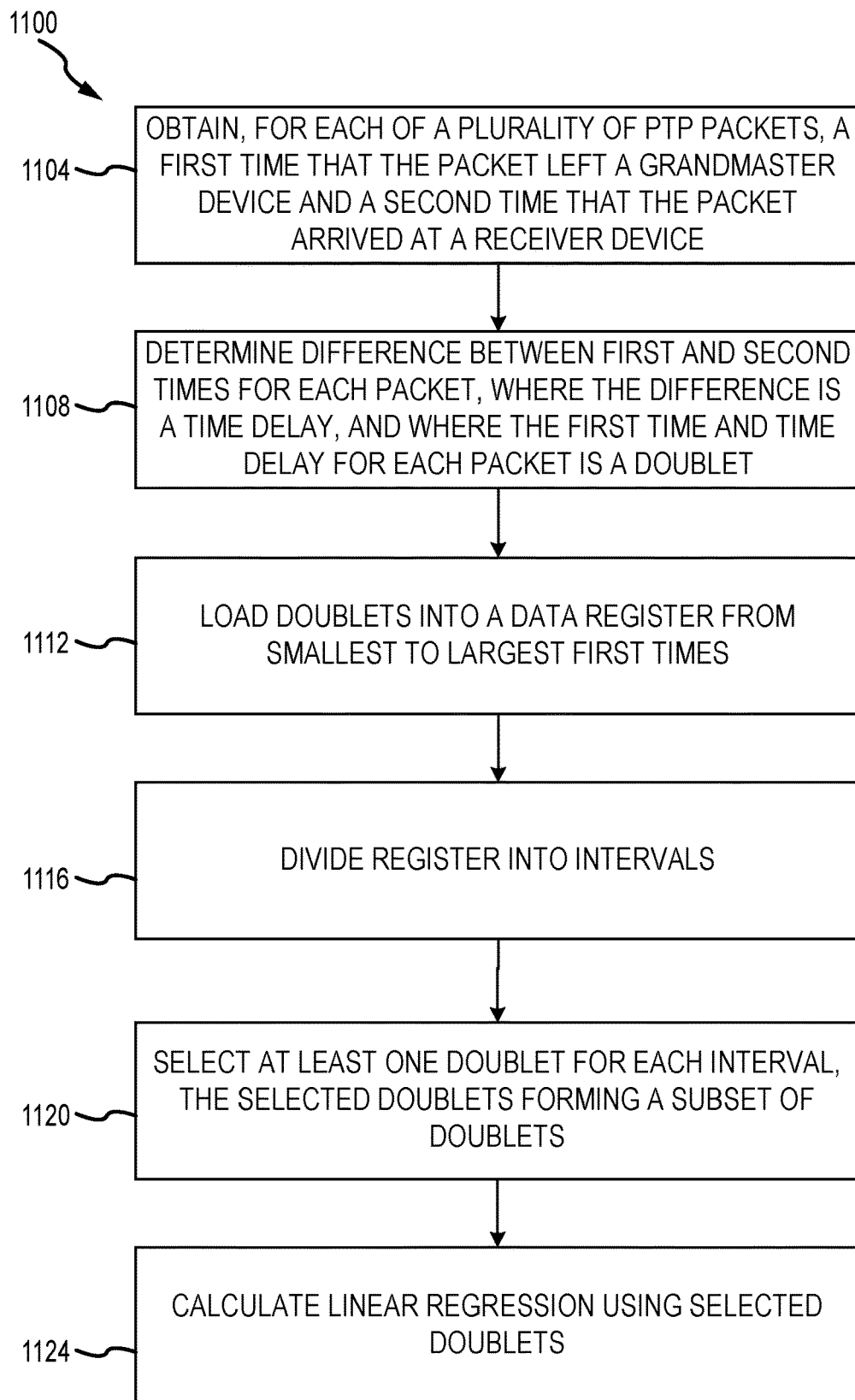
FIG. 11 illustrates a flow diagram of a first portion of a method of manipulating PTP packets received at a receiver device to determine a frequency correction to be made to a local time base of the receiver device.
Figure 12:
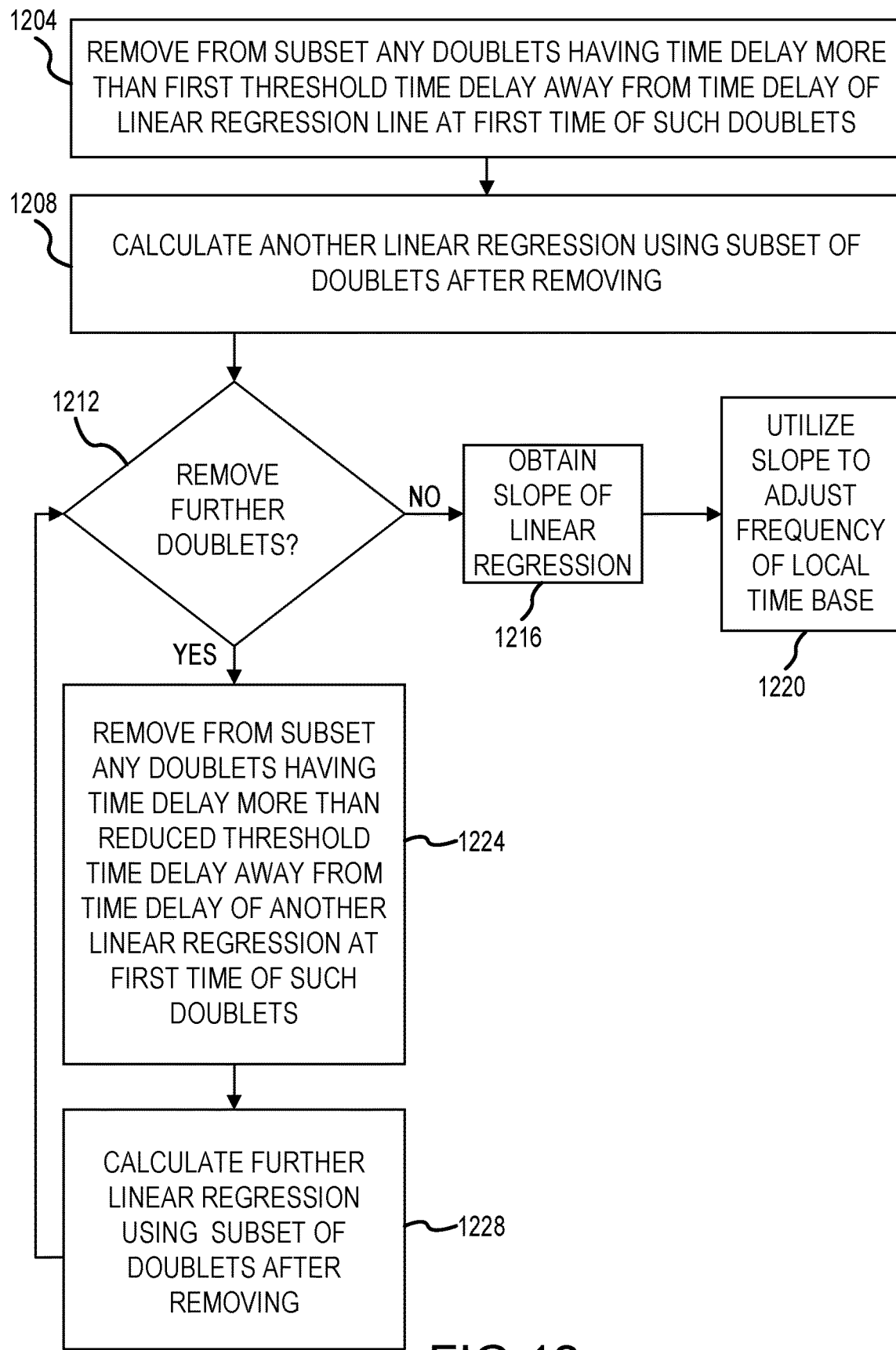
FIG. 12 illustrates a flow diagram of a second portion of a method of manipulating PTP packets received at a receiver device to determine a frequency correction to be made to a local time base of the receiver device.

For each of a plurality of exchanges of PTP packets 370 between the receiver device 316 and the grandmaster device 320 (the same as or different than the grandmaster device 320 discussed in relation to FIGS. 11-12), a round trip delay (RTD) 716 and an estimated time offset (ETO) 720 based on the RTD 716 may be determined 1304. The PTP packets 370 may be at least partially the same as or different than those used by the frequency sync module 328 to determine frequency corrections 336. As an example, each packet exchange may include a "sync" message or packet 204 (e.g., see FIG. 2) sent from the grandmaster device 320 to the receiver device 316 and a "delay request" message or packet 212 sent from the receiver device 316 to the grandmaster device 320. For each packet exchange, respective first and second times 700, 704 (e.g., such as times $t_1$ and $t_2$ in FIG. 2 obtained from first and second time stamps) that the sync message 204 left the grandmaster device 320 (according to the grandmaster device time base) and arrived at the network interface 366 of the receiver device 316 (according to the local time base 348) may be determined and appropriately recorded. In one arrangement, the grandmaster device 320 may generate and send a "follow up" message 208 containing a value of the first time that the sync message 204 left the grandmaster device 320. Also for each packet exchange, respective third and fourth times 708, 712 (e.g., such as times $t_3$ and $t_4$ in FIG. 2 obtained from third and fourth time stamps) that the delay request message 212 left the receiver device 316 (according to the local time base 348) and arrived at the grandmaster device 320 (according to the grandmaster device time base) may be determined and appropriately recorded. In one arrangement, the grandmaster device 320 may generate and send a "delay response" message 216 containing a value of the fourth time that the delay request message 212 arrived at the grandmaster device 320.

The first, second, third, and fourth times 700, 704, 708, 712 for each packet exchange between the receiver device

316 and the grandmaster device 320 may be appropriately manipulated to obtain the RTD 716 and ETO 720 for the packet exchange (e.g., as discussed previously in relation to FIG. 2). In any case, the combination of the RTD 716 and ETO 720 for each packet exchange may be considered a "doublet" 724 or in other words a set (e.g., group, pair, etc.) of data elements that describes the exchange of packets 370. See FIG. 6.

With additional reference again to FIG. 13, the method 1300 may then include loading 1308 the doublets 724 into a data register 800 (e.g., particular memory location) such that the doublet 724 having the smallest RTD 716 is first and continuing to the doublet 724 having the largest RTD 716. As each ETO 720 remains with its respective RTD 716 in a particular doublet 724, the ETOs 720 are not necessarily ordered from smallest to largest in the data register 800. In one arrangement, a particular quantity of doublets 724 may be initially loaded into the data register 800 and then the loaded doublets 724 may be rearranged in order from smallest to largest RTDs 716. In another arrangement, a particular quantity of doublets 724 may be initially identified and then the identified doublets 724 may be loaded into the data register 800 starting with the doublet 724 having the smallest RTD 716 and continuing to the doublet 724 having the largest RTD 716. In any case, the method 1300 may then include manipulating 1312 the ETOs 720 of a subset of the doublets 724 that includes the doublet 724 with the smallest RTD 716 (e.g., at least the first doublet 724 in the ordered data register 800) to obtain a receiver device time offset 736 and then utilizing 1316 the receiver device time offset to adjust a phase of the local time base 348 (where the receiver device time offset would be a timing correction 340 sent to the clock 344 for adjustment of the local time base 348).

Figure 7:
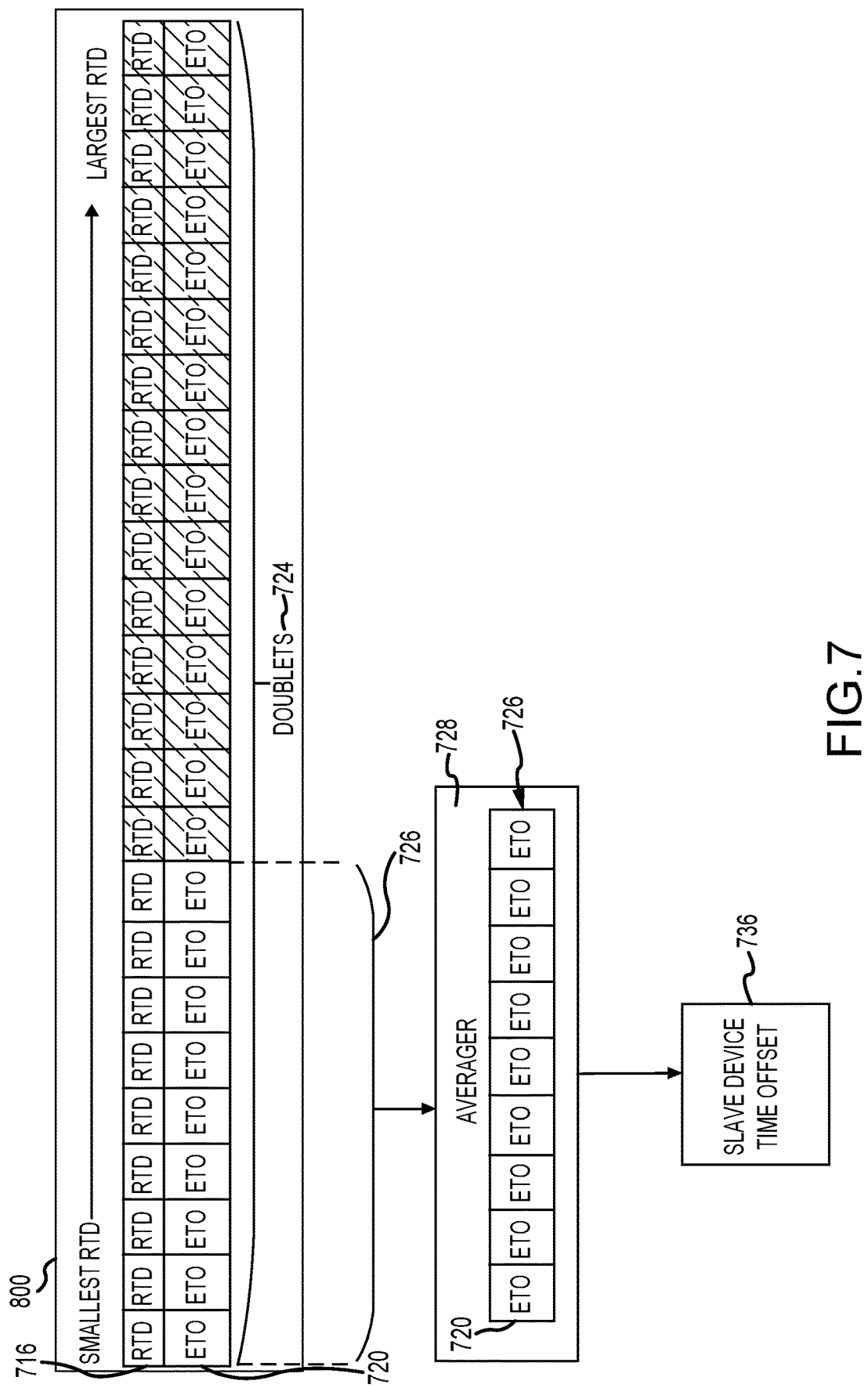
FIG. 7 illustrates a process of manipulating PTP packets received at a receiver device to determine a timing or phase correction to be made to a local time base of the receiver device, according to another embodiment.

With reference now to FIG. 7, a subset 726 of the doublets 724 may be identified, such as the first "x" consecutive doublets 724 in the ordered data register 700 (e.g., the first 10%, the first 20%, etc.). Stated differently, the first "y" largest consecutive doublets 724 (e.g., the shaded doublets in FIG. 7) may be removed from the data register 800 or otherwise ignored from further analysis such that the non-shaded doublets 724 collectively make up the subset 726). In one arrangement, the manipulating 1312 may include averaging the ETOs 720 of the doublet subset 726 (e.g., via averager 728) and equating the resulting ETO average to the receiver device time offset 736.

Figure 8:
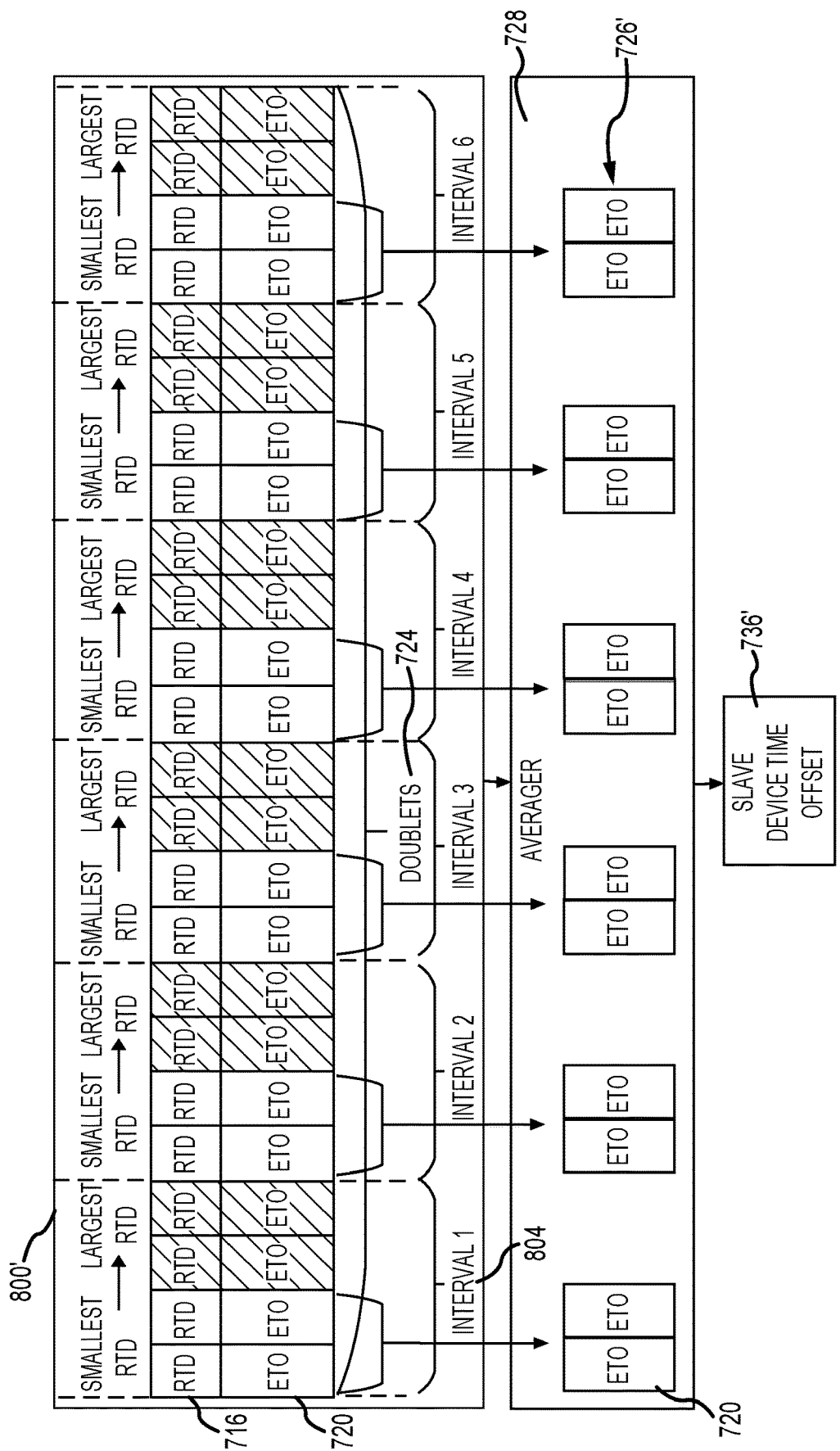
FIG. 8 illustrates a process of manipulating PTP packets received at a receiver device to determine a timing or phase correction to be made to a local time base of the receiver device, according to another embodiment.
Figure 14:
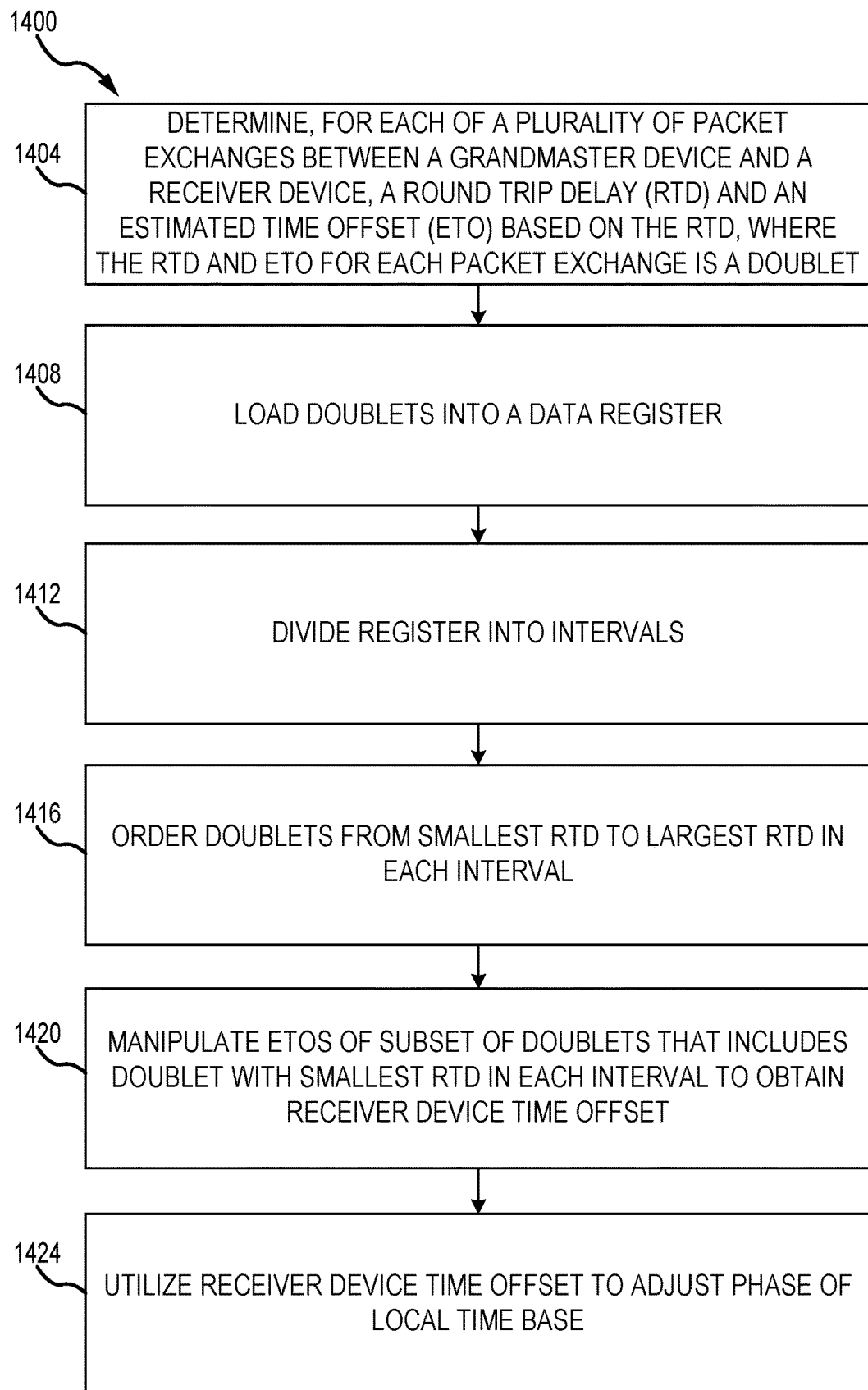
FIG. 14 illustrates a flow diagram of a method of manipulating PTP packets received at a receiver device to determine a timing or phase correction to be made to a local time base of the receiver device, according to another embodiment.

In another embodiment, and turning now to FIGS. 8 and 14, the doublets 724 may be ordered from smallest to largest RTD 716 in each of a plurality of intervals of the data register. After RTDs 716 and ETOs 720 are determined 1404 for each of a plurality of packet exchanges between the receiver device 316 and the grandmaster device 320 (where each RTD 716 and ETO 720 makes up a doublet 724 for a respective packet exchange), the doublets 724 may be loaded 1408 into the data register 800', such as in order from smallest/earliest first time 700 used to determine the doublets 724 to largest/latest first time 700 used to determine the doublets 724 or in other manners. After the data register 800' is divided 1412 into a plurality of intervals 804 (e.g., four doublets to an interval 804 in the example of FIG. 8), the doublets 724 in each respective interval 804 may be ordered 1416 from smallest to largest RTD 716 and then at least the doublet with the smallest RTD 716 (i.e., at least the first doublet 724) in each interval 804 may be identified (e.g., the non-shaded doublets 724), where such identified doublets collectively make up a subset 726' of all of the doublets 724 initially loaded into the register. The intervals 804 may be created either before or after the doublets 724 are initially loaded into the data register 800'.

The ETOs 720 of the subset of doublets 724 may then be manipulated 1420 to obtain a receiver device time offset (e.g., timing correction 340) and then the receiver device time offset may be utilized 1424 to adjust a phase of the local time base 348. In one arrangement, the manipulating 1420 may include averaging the ETOs 720 of the doublet subset (e.g., via averager 728') and equating the resulting ETO average to the receiver device time offset 736'.

One or more selected "outlying" doublets from the identified subsets 726, 726' may be identified and removed from the analysis before the manipulating steps 1312, 1420 to further refine and improve the determined receiver device offset value. For instance, a standard deviation of the ETOs 720 of the doublets remaining in the subset 726, 726' may be determined. Thereafter, it may be determined, for each doublet 724 in the subset 726, 726', whether an absolute value of the ETO 720 of the doublet 724 less the average of the ETO 720 is greater than any appropriate multiple (e.g., 1, 2, 3, etc.) of the standard deviation. Doublets 724 associated with a positive answer to the above determining step may be removed from the remaining doublet subset and then the average of the ETOs 720 of the remaining doublets 724 may be again determined.

Collectively manipulating (e.g., averaging or the like) the ETOs 720 of a group of the doublets 724 with the smallest RTDs 716 (or in other words a group of packet exchanges identified by the smallest RTDs 716) to obtain a receiver device time offset 736, 736' as discussed above advantageously reduces the peak to peak error or range over all of the data analyzed while resulting in a receiver device time offset 736, 736' that is about the same as or better than that determined using just the single doublet 724/packet exchange identified by the smallest RTD 716.

Figure 9:
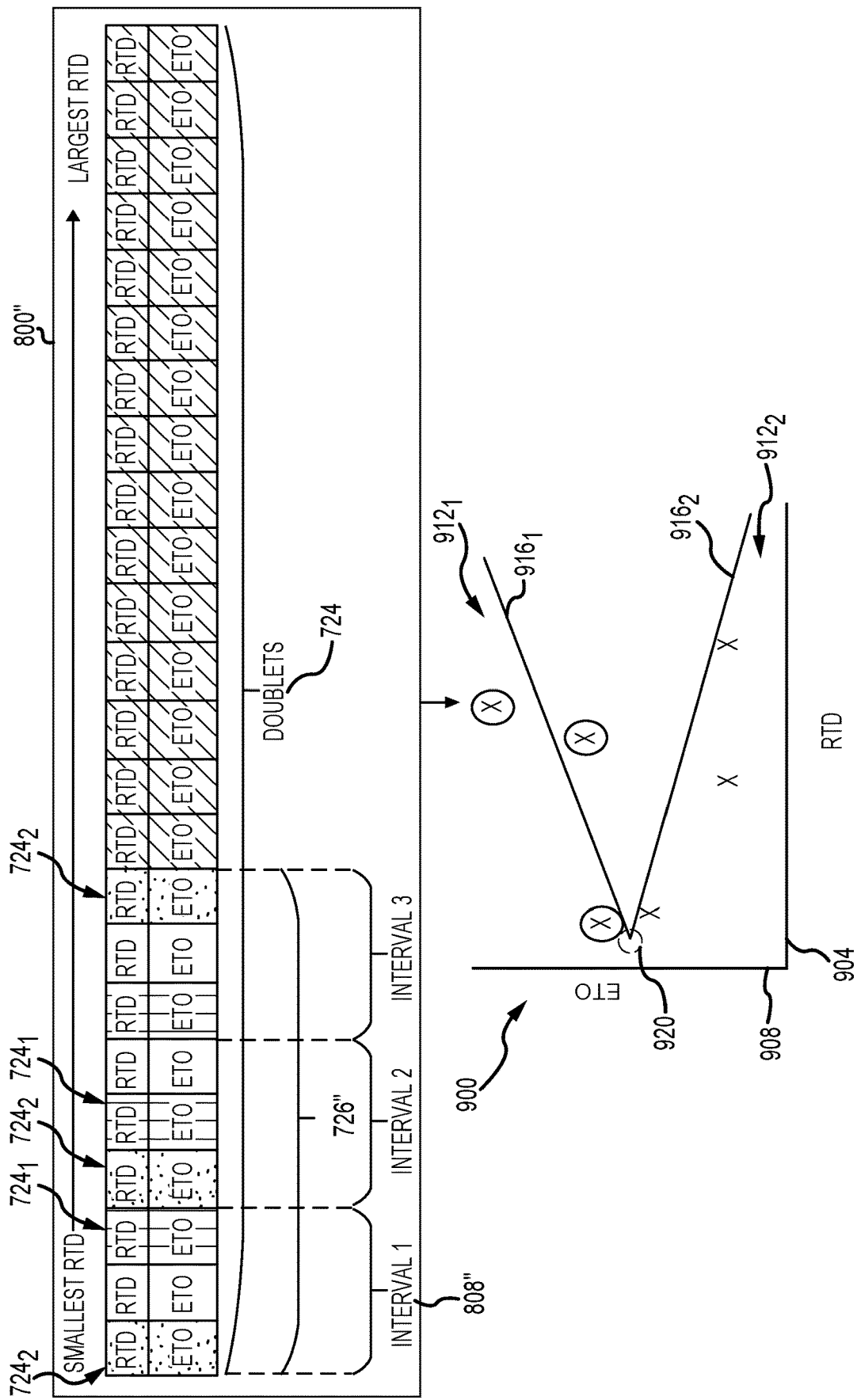
FIG. 9 illustrates a process of manipulating PTP packets received at a receiver device to determine a timing or phase correction to be made to a local time base of the receiver device, according to another embodiment.
Figure 15:
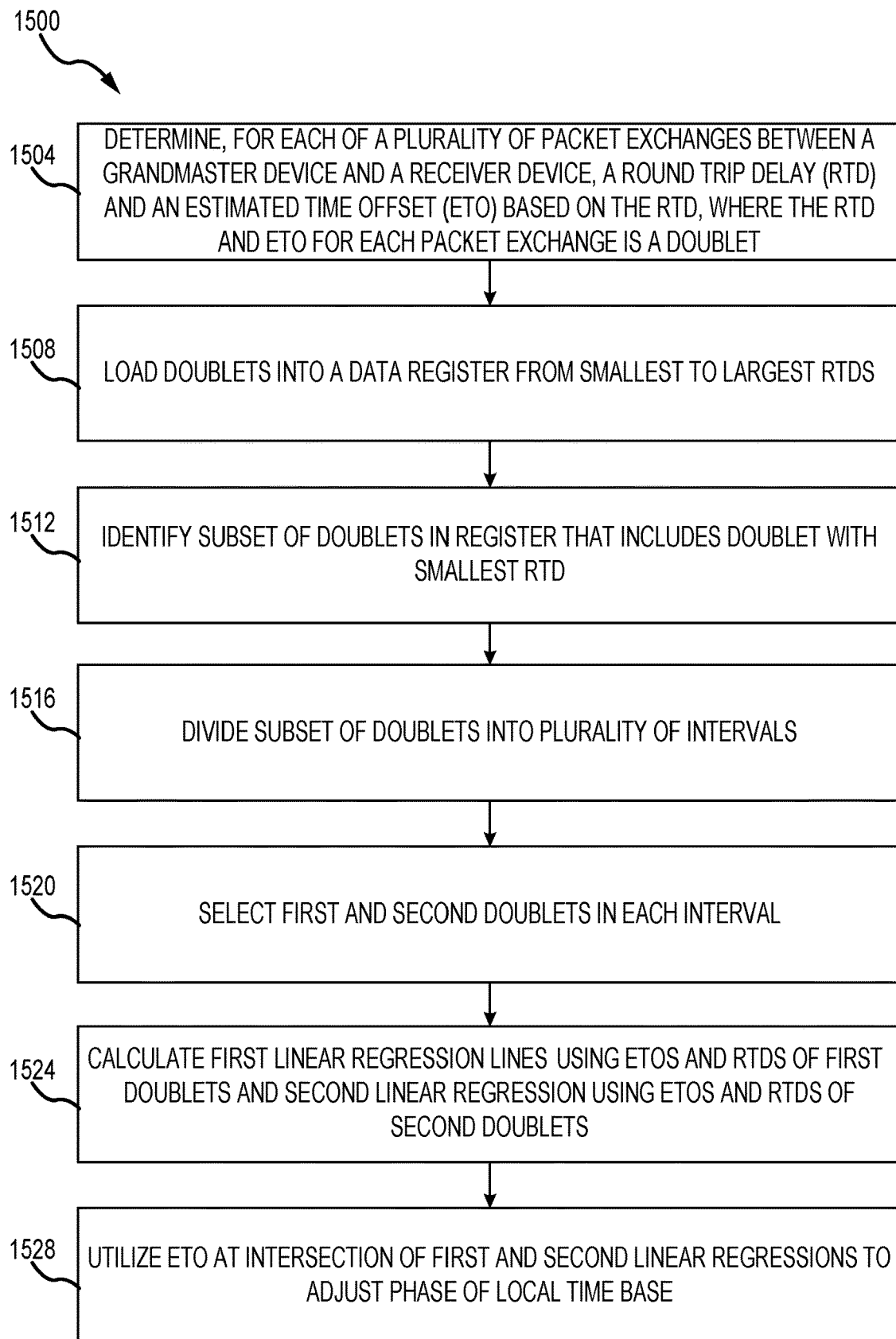
FIG. 15 illustrates a flow diagram of a method of manipulating PTP packets received at a receiver device to determine a timing or phase correction to be made to a local time base of the receiver device, according to another embodiment.

In another embodiment, and after the doublets 724 have been loaded into the data register 800 where the doublets are ordered from smallest to largest RTD 716 and a subset 726" of the doublets with the smallest RTDs 716 has been identified, the subset may be divided into intervals and then one or more doublets 724 in each interval may be manipulated to obtain a receiver device time offset (e.g., as in FIG. 9). Turning now to the method 1500 of FIG. 15, RTDs 716 and ETOs 720 may be determined 1504 for each of a plurality of packet exchanges between the receiver device 316 and the grandmaster device 320 (where each RTD 716 and ETO 720 makes up a doublet 724 for a respective packet exchange), the doublets 724 may be loaded 1508 into the data register 800" (see FIG. 9) from smallest to largest RTD 716, and a subset 726" of doublets 724 may be identified 1512. For instance, the subset 726" may include a group of consecutive doublets 724 that includes the doublet with the smallest RTD 716 (e.g., the first doublet 716 in the ordered data register 800").

Thereafter, the subset 726" may be divided 1516 into a plurality of intervals 808" (e.g., where each interval 808" includes the same number of doublets 724) and first and second doublets $724_1$, $724_2$ may be selected 1520 from each interval 808". First and second linear regression lines $916_1$, $916_2$ (which may be appropriately combined into a single linear regression plot 900 of RTD/x-axis 904 v. ETO 908) may then be respectively calculated 1524 using first and second data points $912_1$, $912_2$ plotted using the first and second doublets $724_1$, $724_2$, and the ETO 920 at the intersection of the first and second linear regression lines $916_1$, $916_2$ may be utilized as the receiver device time offset (e.g., timing correction 340) to adjust the phase of the local time base 348 of the receiver device 316. As one example, the first doublet $724_1$ in each interval 808" may be the doublet 724 having the largest RTD 716 in the interval while the second doublet $724_2$ in each interval 808" may be the doublet 724 having the smallest RTD 716 in the interval 808".

In one arrangement, further windows of doublets 724 may be appropriately used to generate further linear regressions and obtain further intersection values, where the various obtained intersection values may be manipulated in any appropriate manner (e.g., averaging or the like) to determine or obtain a receiver device time offset that may be used as a timing correction 340. For instance, the doublets 724 in the data register 808" in FIG. 9 may be a first plurality of doublets 724 corresponding to a first window of time, and doublets corresponding to one or more additional windows of time (e.g., as determined by whether or not the first time 700 from which the doublet 724 was generated is within such additional windows of time) may be utilized in the manner discussed above to generate further linear regressions 900 and obtain further intersection values 920. Such windows of time may be interleaved, non-interleaved, or the like. The disclosed manner of determining timing corrections 340 using discrete portions of PTP data advantageously increases the accuracy of the timing synchronizations as compared to continuously receiving PTP packet data and generating corresponding time offsets.

As discussed previously, large time uncertainties, time jitter, and the like present in the open Internet can sometimes make it difficult to transfer microsecond grade (or finer) time from a grandmaster device or other source to a receiver device which is often needed for purposes of assisting a GPS fix or the like. For instance, path asymmetries may be so large that they are out of the GPS time search range and time jitter may be beyond the available search range of the system causing even stepped or ring systems to produce suboptimal results. Still further, network routes can change dynamically causing instant changes in time transfer (e.g., which may be undetectable by current systems).

In this regard and returning to FIG. 4, the timing sync module 332 may, in addition to or as an alternative to receiving and manipulating PTP packet exchange data to determine timing corrections 340, receive positioning system signals 312 (e.g., PRN sequences 314) from one or more known, particular positioning system sources (e.g., satellites 308) and utilize the received signals 312 to determine timing corrections 340 as will be discussed below. For instance, the positioning system receiver 356 may receive PRN sequences 314 from satellite(s) 308 via antenna 313 and then pass the same to the timing sync module 332 in any appropriate manner. Broadly, the timing sync module 332 may be configured to generate, at each of a plurality of different respective time offsets relative to a starting reference time of the local time base 348 of the receiver device 316, a PRN sequence of a known GNSS satellite 308. Upon correlation of a particular one of the generated PRN sequences with a received PRN sequence 314 from the known GNSS satellite 308, the time offset of the particular generated PRN sequence relative to the reference time of the local time base 348 may be used to update or correct the local time base 348 of the receiver device 316 so that it is synchronized with the grandmaster time base (or in other words GPS/GNSS time). The disclosed utilities allow for the recovery of fine time (e.g., 100-200 ns) with respect to the time base of GPS/GNSS.

Figure 10:
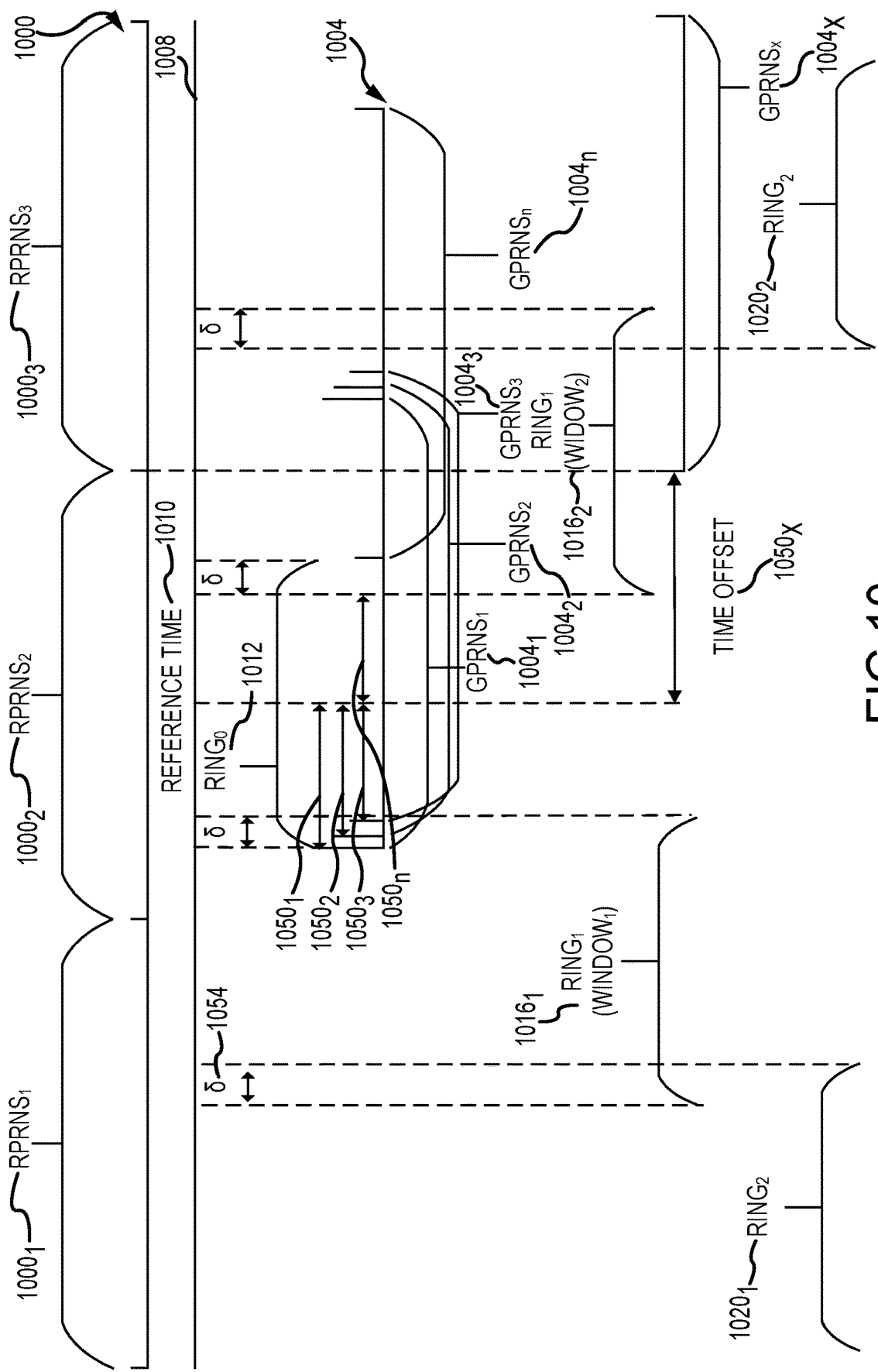
FIG. 10 illustrates the use of pseudo random number sequences received at a receiver device from one or more GNSS satellites to determine a timing or phase correction to be made to a local time base of the receiver device.
Figure 16:
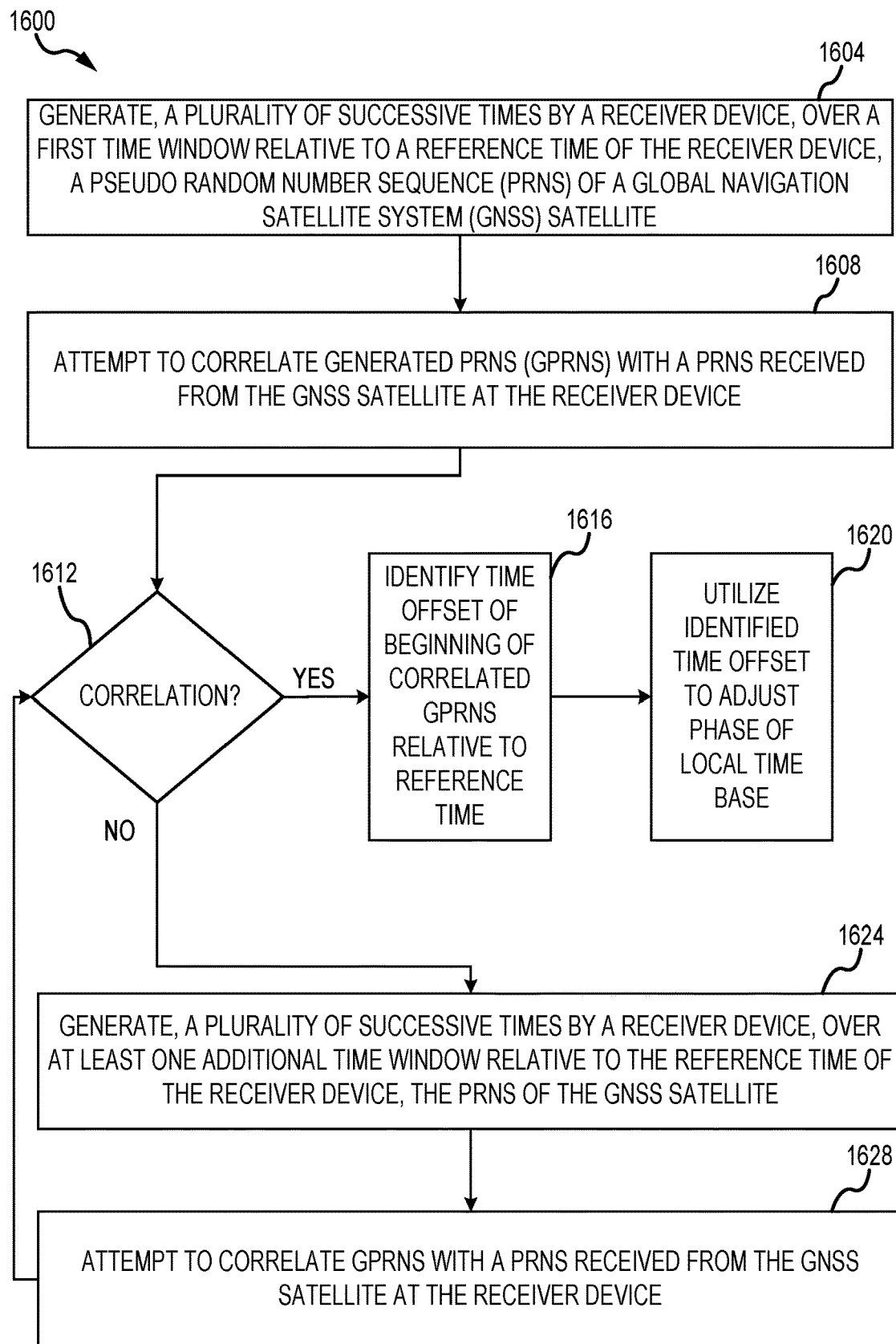
FIG. 16 illustrates a flow diagram of a method of manipulating pseudo random number sequences received at a receiver device from one or more GNSS satellites to determine a timing or phase correction to be made to a local time base of the receiver device.

FIG. 10 schematically illustrates how attempted correlations between positioning system signals (e.g., PRN sequences 1000) received from a particular known satellite (e.g., GPS satellite 308 in FIG. 4) and corresponding (e.g., identical) signals (PRN sequences 1004) generated by a receiver device (e.g., receiver device 316) may be used to determine timing corrections to be made to the phase component of the local time base 348. Reference will also be made to FIG. 16 which illustrates a flow diagram of a method 1600 of manipulating PRN sequences received at a receiver device from one or more GNSS satellites to determine a timing or phase correction to be made to a local time base of the receiver device.

One or more preliminary adjustments or corrections may be made to the local time base 348 before determining timing corrections to be made according to the method 1600 of FIG. 16. In one arrangement, the frequency sync module 328 may determine one or more frequency corrections 336 according to, for instance, the method 1100 of FIGS. 11-12. For instance, the determined frequency corrections 336 may be input into a DAC or the like to program the frequency of the oscillator 352 and thus that of the local time base 348. As just one example, the oscillator may be corrected to +/−120 Hz or +/−76 parts per billion (ppb) (referred to GPS at 1575.42 MHz).

Additionally, a divider or PLL may be used to correct the frequency component of the local time base 348 (e.g., after the above oscillator programming using a DAC) based on PTP. For instance, one or more time delays of PTP packets sent from a grandmaster device (e.g., grandmaster device 320 in FIG. 4) to the receiver device 316 (e.g., the difference between the first and second time 400, 404 in FIG. 5) may be used as input to the divider or PLL. There may still be a residual digital frequency error on the oscillator 352 (e.g., <33 ppb) after setting the divider or PLL.

At step 1604 in FIG. 16, a PRN sequence 1004 (see FIG. 10) of a particular (known) GNSS satellite (e.g., GNSS satellite 308 in FIG. 4) may be generated by the receiver device 316 (e.g., by timing sync module 332) a plurality of successive times over a first time window (e.g., $Ring_0$ 1012) relative to a reference time 1010 of the local time base 348 of the receiver device 316. Initially, a plurality of time windows or "rings" may be created in a "search space" 1008 on the local time base 348 relative to the reference time 1010 (e.g., time "zero"). An initial ring or window (e.g., $Ring_0$ 1012) may be in the form of a particular span of time (e.g., 40 μs) that is centered on the reference time 1010 such that $Ring_0$ 1012 starts at a negative "half span" (e.g., −20 μs) and ends at a positive "half span" (e.g., −20 μs).

For instance, FIG. 10 illustrates a plurality of successively generated PRN sequences 1004 that each begin at a different time offset 1050 from the reference time 1010 within $Ring_0$ 1012. For instance, a first generated PRN sequence $1004_1$ begins at (negative) time offset $1050_1$ from the reference time 1010, a second generated PRN sequence $1004_2$ begins at (negative) time offset $1050_2$ from the reference time 1010, a third generated PRN sequence $1004_3$ begins at (negative) time offset $1050_3$ from the reference time, 1010 and a last generated PRN sequence $1004_n$ begins at a (positive) time offset $1050_n$ from the reference time 1010.

At step 1608, the method 1600 may attempt to correlate each generated PRN sequence with a received PRN sequence 1000 from the particular GNSS satellite. For instance, a correlation may occur when a particular generated PRN sequence and one of the received PRN sequences 1000 begin at substantially the same time according to the local time base 348. In one arrangement, this process may include utilizing a plurality of non-coherent integrations (NCIs).

In the event that a correlation is made, the particular time offset 1050 between the starting time of the particular generated PRN sequence and the reference time 1010 may be identified 1616 and used 1620 to shift the leading pulse edge of the local time base 348 of the receiver device 316 (e.g., or in other words "skew the clock") to closely synchronize the phase component of the local time base 348 with that of GPS/GNSS (e.g., to within 100-200 ns or better). Thereafter, positioning signals from one or more GNSS satellites may be acquired by the receiver device and then an attempt to fix the position of the receiver device using the acquired GNSS signal(s) and the synchronized local time base of the receiver device may be initiated (e.g., by positioning system receiver 356 of FIG. 4).

In the example presented in FIG. 10, none of the generated PRN sequences 1004 that begin in $Ring_0$ 1012 correlate with any of the received PRN sequences 1000. Accordingly, PRN sequences may be generated 1624 and correlations attempted 1628 for one or more additional windows or rings of time in the search space 1008 relative to the reference time 1010. As it may be difficult to a priori determine the sign of the path asymmetries (e.g., the difference in path lengths), each subsequently searched portion or ring of the search space 1008 may be in the nature of positive window of time and a corresponding negative window of time in the search space 1008 (or in other words a "two-sided ring"). For instance, a second ring (e.g., $Ring_1$ 1016) may include a first window $1016_1$ that begins at or approximately at a negative "full span" (e.g., at/near −40 μs in the above example) and ends at or near a negative half span (e.g., at/near −20 μs in the above example) and a second window $1016_2$ that begins at or near a positive half span (e.g., at/near 20 μs in the above example) and ends at or near a positive full span (e.g., at/near 40 μs in the above example). Again, the same PRN sequence 1000 of the particular GNSS satellite may be generated 1624 each of a plurality of times within the ring and correlations between each generated PRN sequence and corresponding PRN signals acquired by the receiver device may be attempted 1628.

In the example of FIG. 10, a particular generated PRN sequence $1004_x$ in second window $1016_2$ (not all generated PRN sequences 1004 illustrated in the interest of clarity) is shown to correlate with received PRN sequence $1003_3$ (as illustrated by both of the received PRN sequence $1003_3$ and generated PRN sequence $1004_x$ beginning and ending at the same (or substantially the same) times in the search space 1008 of the local time base 348. In this regard, the time offset $1050_x$ may be identified 1616 and utilized 1620 to adjust the phase component of the local time base 348.

In the event it was again determined at 1612 that none of the generated PRN sequences 1004 correlated with a received PRN sequence 1000, then further additional rings or windows of time (e.g., windows $1020_1$, $1020_2$ of $Ring_2$ 1010) may be appropriately searched by way of the generating and attempting steps 1624, 1628. In one arrangement, the search space 1008 may be "tiled" (segmented into rings/windows) for up to a full GPS/GNSS epoch (e.g., 1 ms) to fully sweep the code space where the correlation peak resides.

Various network asymmetries may be taken into account in a number of manners to facilitate probing the search space 1008 to obtain accurate receiver device time offset values. More specifically, adjacent rings/windows (e.g., $Ring_0$ 1012 and window $1016_1$; $Ring_0$ 1012 and window $1016_2$; window $1016_1$ and window $1020_1$; etc.) may be overlapped by an appropriate overlap time amount δ 1054 that accounts for drift in the local oscillator 352 so as to avoid or limit missing a correlation that may otherwise result but for any residual frequency error. The overlap time amount δ 1054 may be selected to account for frequency error (from nominal) in the oscillator 352. In one arrangement, the overlap time amount δ 1054 may be determined by computing a first time offset with respect to the oscillator 352 (e.g., using 30 s of PTP data). After a 1000 s time period, for instance, another 30 s PTP/NTP session could result in a second time offset. The fractional oscillator error $E_{xo}$ may then be $(offset_2 - offset_1)/1000$ s/s. If one thus chose to perform a 300 s integration (depending on signal levels), the overlap time amount δ 1054 could be set to $>=300*E_{xo}$. In another arrangement, $E_{xo}$ could be determined by using one-way PTP messages from a grandmaster device 320 to the receiver device 316 (e.g., sync messages 204 in FIG. 3). In further arrangements, other frequency sources may be utilized to deduce the frequency error in the oscillator 352 (e.g., eLoran, TRIG time codes, etc.).

In some situations, network jitter may allow for time recovery with low variance, where a fixed mean time error causes small variations (e.g., less than 2 μs) within PTP session to PTP session. In this case, the overlap time amount δ 1054 may be greater than the error induced by such network jitter (e.g., 2 μs). For instance, rather than the above-discussed second ring $1016_1$ spanning from −40 μs to −20 μs and then from 20 μs to 40 μs, the second ring $1016_1$ may span from −38 μs to −18 μs and then from 18 μs to 38 μs so as to overlap the first ring by 2 μs (i.e., such that the overlap time amount δ 1054 is 2 μs).

To attempt to keep approximately the same absolute PPS error between successive rings (e.g., $Ring_0$ 1010, $Ring_1$ 1016, $Ring_2$ 1020, etc.), a PTP session (e.g., 30 seconds) may be run before each respective ring is searched so as to reset the reference time 1010 of the receiver device 316. Restarting PTP for each successive ring thus resets local oscillator drift for each ring to limit such drift from accumulating across rings. Before searching the rings, the receiver device 316 may be placed into "holdover" which means that the receiver device is severed from the network (e.g., Internet). Placing the receiver device into holdover fixes the residual time error such that the network jitter becomes zero for the remainder of the search.

In many situations, network jitter can make it difficult or impossible to recover the same time with the same error. For instance, given a perfect local oscillator, jitter may be considered large if the absolute value of the difference between a time offset measured at a first time and time offset measured at a later time is greater than 100 μs. In this case, PTP may be restarted once before searching the first ring ($Ring_0$ 1010) to recover time and then maintain the system in holdover while searching the rings (i.e., without restarting PTP before each subsequent ring). As local oscillator drift (frequency drift) may thus accumulate across adjacent rings, the rings may be overlapped by an amount of time (overlap time amount δ 1054) that takes into account such anticipated accumulation. In addition to conducting the above-discussed time search, it is noted that a per ring frequency search may be conducted (e.g., which may be the same) so that the search space can be 2D time and frequency.

In one arrangement, one or more of the frequency and timing corrections 336, 340 may be provided as input to any appropriate quality assessment module or functionality that is operative to determine if the quality of the corrections 336, 340 exceeds a quality threshold (e.g., whether errors in the corrections 336, 340 are less than a threshold error value). For instance, the threshold values may be based on the preferred accuracy for the receiver device 316 of within about +/−100 Hz and +/−50 μs. In the event that the corrections 336, 340 do not provide the predetermined level of quality, the frequency and/or timing sync modules 328, 332 may operate to determine additional frequency and/or timing corrections 336, 340.

Once the timing signal 374 (e.g., PPS signal) of the corrected local time base 348 meets the quality threshold, the frequency and phase portions of the local time base 348 may be to allow for priming of the receiver device 316. In this regard, the positioning system receiver 356 (see FIG. 4), now receiving an accurate, corrected timing signal 374, may attempt to acquire positioning system signals 312 from the positioning system 304 for purposes of establishing an accurate location of the receiver device 316 (a GNSS fix).

In one arrangement, and after phase and frequency have been appropriately calculated from a GNSS fix, the PPS rate can be appropriately adjusted without touching the voltage on the oscillator 352 (e.g., in addition to slewing the phase). For instance, the number of counts required to hit the next PPS may be internally adjusted by taking into account the known residual error of the oscillator 352; this may be accomplished through the use of small Doppler bins, observing the fine phase error between consecutive position fixes, and/or the like.

While the foregoing has illustrated and described several embodiments in detail in the drawings and foregoing description, such illustration and description is to be considered as exemplary and not restrictive in character. For instance, while the network-based packets received via the network interface 366 have been primarily discussed at PTP packets, other types of timing packets may be utilized as well (e.g., NTP packets).

Furthermore, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the disclosure are desired to be protected.

What is claimed is:

1. A method for synchronizing a local clock at a device, comprising:
   determining, using a processor and for each packet exchange of a plurality of packet exchanges between a master device and a slave device in a packet-based network of computers, a) a round trip delay (RTD) based on i) a first message sent from the master device to the slave device and ii) a second message sent from the slave device to the master device, and b) a time offset for use in adjusting a local clock at the slave device based on the RTD, wherein each RTD and its respective time offset for each respective packet exchange is a doublet, and wherein the determining includes obtaining a respective doublet for each packet exchange of the plurality of packet exchanges;
   loading the plurality of doublets into a data register;
   ordering the plurality of doublets in the data register according to RTD by starting with the doublet having the smallest RTD of all of the plurality of doublets and continuing to the doublet having the largest RTD of all of the plurality of doublets;
   identifying a subset of adjacent doublets in the ordered data register that includes the doublet having the smallest RTD of all of the plurality of doublets;
   manipulating the time offsets of the identified subset of adjacent doublets to obtain a slave device offset estimate; and
   providing the slave device offset estimate for use in updating the local clock of the slave device.

2. The method of claim 1, wherein the manipulating includes averaging such that the obtained slave device offset estimate is an average of the time offsets of the identified subset.

3. The method of claim 2, further including:
   ascertaining a standard deviation of the time offsets of the identified subset of doublets;
   for each doublet in the identified subset of doublets:
      determining whether an absolute value of the time offset of the doublet less the average of the time offsets is greater than a multiple of the standard deviation;
      removing the doublet from the identified subset when the determining is positive; and
      leaving the doublet in the identified subset when the determining is negative; and
   repeating the manipulating after the removing and leaving.

4. The method claim 1, further including after the loading:
   dividing the data register into a plurality of intervals, wherein:
      the ordering includes, for each of the plurality of intervals, ordering the plurality of doublets in said each interval according to RTD by starting with the doublet having the smallest RTD of all of the plurality of doublets in said each interval and continuing to the doublet having the largest RTD of all of the plurality of doublets in said each interval;
      the identifying includes, for each of the plurality of intervals, identifying a subset of adjacent doublets in said each interval that includes the doublet having the smallest RTD of all of the plurality of doublets in said each interval; and
      wherein the manipulating includes manipulating the time offsets of the identified subsets of adjacent doublets in the plurality of intervals to obtain the slave device offset estimate.

5. The method of claim 4, wherein the manipulating includes averaging such that the obtained slave device offset estimate is an average of the time offsets of the identified subsets.

6. The method of claim 4, further including:
   for each subset of doublets in each interval, ascertaining an average and a standard deviation of the time offsets of the subset of doublets in the interval;
   for each doublet in each subset of doublets in each interval:
      determining whether an absolute value of the time offset of the doublet less the time offset average of its respective interval is greater than a multiple of the standard deviation of the respective interval;
      removing the doublet from its respective interval when the determining is positive; and
      leaving the doublet in its respective interval when the determining is negative; and
   repeating the manipulating after the removing and leaving.

7. The method of claim 4, wherein the plurality of intervals are contiguous.

8. The method of claim 1, further including:
   dividing the subset of doublets in the data register into a plurality of intervals; and identifying, for each of the plurality of intervals, first and second doublets in the interval, wherein the manipulating includes:
calculating, using the processor, a first linear regression using the time offsets and RTDs of the first doublets;
calculating, using the processor, a second linear regression using the time offsets and RTDs of the second doublets; and
locating a time offset value at an intersection of the first and second linear regressions, wherein the slave device offset estimate is determined using the time offset value at the intersection of the first and second linear regressions.

9. The method of claim 8, wherein the first doublet in each interval has the largest time offset of all of the doublets in the interval, and wherein the second doublet in each interval has the smallest time offset of all of the doublets in the interval.

10. The method of claim 8, wherein the plurality of doublets loaded into the data register is a first plurality of doublets such that the time offset value at the intersection of the first and second linear regressions is a first intersection time offset value, and wherein the method further includes:
loading a second plurality of doublets into the data register;
ordering the second plurality of doublets of the data register according to RTD by starting with the doublet having the smallest RTD of all of the second plurality of doublets and continuing to the doublet having the largest RTD of all of the second plurality of doublets in the second window;
identifying a subset of adjacent doublets that includes the doublet having the smallest RTD of all of the second plurality of doublets;
dividing the subset of doublets in the second plurality of doublets of the data register into a plurality of intervals; and
identifying, for each of the plurality of intervals in the second plurality of doublets, first and second doublets in the interval, wherein the manipulating includes:
calculating, using the processor, a first linear regression using the time offsets and RTDs of the first doublets;
calculating, using the processor, a second linear regression using the time offsets and RTDs of the second doublets; and
locating a time offset value at an intersection of the first and second linear regressions, wherein the time offset value at the intersection of the first and second linear regressions is a second intersection time offset value; and
wherein the slave device offset estimate is determined using the first and second intersection time offset values.

11. The method of claim 10, further including:
averaging the first and second intersection time offset values to obtain an averaged intersection time offset value, wherein the slave device offset estimate is the averaged intersection time offset value.

12. The method of claim 10, wherein the first plurality of doublets corresponding to a first window of time, and wherein the second plurality of doublets corresponds to a second window of time.

13. The method of claim 12, wherein the first and second windows of time are interleaved.

14. The method of claim 12, wherein the first and second windows of time are non-interleaved.

15. The method of claim 1, wherein:
the first message is identified by a first time stamp that indicates a first time that the first message left the master device and a second time stamp that indicates a second time that the first message arrived at the slave device; and
the second message is identified by a third time stamp that indicates a third time that the second message left the slave device and a fourth time stamp that indicates a fourth time that the second message arrived at the master device.

16. The method of claim 15, wherein the RTD is the sum of i) the difference between second and first times and ii) the difference between the fourth and third times.

17. The method of claim 15, wherein the time offset is half of the difference between i) the difference between second and first times and ii) the difference between the fourth and third times.

18. A method for synchronizing a local clock at a device, comprising:
determining, using a processor and for each packet exchange of a plurality of packet exchanges between a master device and a slave device in a packet-based network of computers, a) a round trip delay (RTD) based on i) a first message sent from the master device to the slave device and ii) a second message sent from the slave device to the master device, and b) a time offset for use in adjusting a local clock at the slave device based on the RTD, wherein each RTD and its respective time offset for each respective packet exchange is a doublet, and wherein the determining includes obtaining a respective doublet for each packet exchange of the plurality of packet exchanges;
loading the plurality of doublets into a data register;
ordering the plurality of doublets in the data register according to RTD by starting with the doublet having the smallest RTD of all of the plurality of doublets and continuing to the doublet having the largest RTD of all of the plurality of doublets;
removing a subset of adjacent doublets in the ordered data register that includes the doublet having the largest RTD of all of the plurality of doublets;
manipulating the time offsets of the doublets remaining in the ordered data register after the removing step to obtain a slave device offset estimate; and
providing the slave device offset estimate for use in updating the local clock of the slave device.

19. The method of claim 18, further including:
dividing the doublets remaining in the ordered data register after the removing step into a plurality of intervals; and
identifying, for each of the plurality of intervals, first and second doublets in the interval, wherein the manipulating includes:
calculating, using the processor, a first linear regression using the time offsets and RTDs of the first doublets;
calculating, using the processor, a second linear regression using the time offsets and RTDs of the second doublets; and
locating a time offset value at an intersection of the first and second linear regressions, wherein the slave device offset estimate is determined using the time offset value at the intersection of the first and second linear regressions.

20. A system for synchronizing a local clock at a receiver device, the system comprising:
- a local clock operative to generate a timing signal;
- a network interface module in operative communication with an asynchronous packet-switched communication network to engage in a series of synchronization packet exchanges with a grandmaster device;
- a synchronization module in operative communication with the network interface module for synchronizing the timing signal generated by the local clock based on the packets exchanges with the grandmaster device, wherein the synchronization module includes a set of computer-readable instructions that are executable by a processor to:
  - determine, for each of the packet exchanges, a) a round trip delay (RTD) based on i) a first message sent from the grandmaster device to the receiver device and ii) a second message sent from the receiver device to the grandmaster device, and b) a time offset for use in adjusting the timing signal generated by the local reference oscillator based on the RTD, wherein each RTD and its respective time offset for each respective packet exchange is a doublet, and wherein a respective doublet is obtained for each packet exchange of the series of packet exchanges;
  - load the plurality of doublets into a data register;
  - order the plurality of doublets in the data register according to RTD by starting with the doublet having the smallest RTD of all of the plurality of doublets and continuing to the doublet having the largest RTD of all of the plurality of doublets;
  - identify a subset of adjacent doublets in the ordered data register that includes the doublet having the smallest RTD of all of the plurality of doublets;
  - manipulate the time offsets of the identified subset of adjacent doublets to obtain a receiver device offset estimate; and
  - provide the receiver device offset estimate for use in synchronizing the local clock of the receiver device.

* * * * *